(12) United States Patent
Ito et al.

(10) Patent No.: US 8,334,339 B2
(45) Date of Patent: Dec. 18, 2012

(54) CONJUGATED DIENE-BASED POLYMER, CONJUGATED DIENE-BASED POLYMER COMPOSITION, AND PROCESS FOR PRODUCING CONJUGATED DIENE-BASED POLYMER

(75) Inventors: Mana Ito, Ichihara (JP); Katsunari Inagaki, Ichihara (JP); Mayumi Oshima, Ichihara (JP)

(73) Assignee: Sumitomo Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/206,166

(22) Filed: Aug. 9, 2011

(65) Prior Publication Data
US 2012/0041134 A1   Feb. 16, 2012

(30) Foreign Application Priority Data

Aug. 11, 2010   (JP) ................................. 2010-180024

(51) Int. Cl.
  *C08L 43/04*   (2006.01)
  *C08F 230/08*   (2006.01)
  *C08F 8/32*   (2006.01)
  *C08F 8/34*   (2006.01)
  *C08K 3/36*   (2006.01)

(52) U.S. Cl. ..................... 524/547; 525/326.5; 525/352; 525/379; 526/279

(58) Field of Classification Search .................. None
See application file for complete search history.

(56) References Cited

U.S. PATENT DOCUMENTS

| | | | | |
|---|---|---|---|---|
| 3,485,857 A * | 12/1969 | Speier | ............................. | 556/12 |
| 3,504,007 A * | 3/1970 | William et al. | ............... | 556/413 |
| 3,853,994 A * | 12/1974 | Barcza | ............................. | 514/63 |
| 3,900,679 A * | 8/1975 | Marzocchi | ..................... | 428/378 |
| 4,183,844 A * | 1/1980 | Streck et al. | ................... | 523/209 |
| 4,396,751 A * | 8/1983 | Kampf et al. | .................. | 526/279 |
| 4,894,409 A * | 1/1990 | Shimada et al. | ............... | 524/492 |
| 5,128,416 A * | 7/1992 | Imai et al. | ...................... | 525/254 |
| 5,189,109 A * | 2/1993 | Imai et al. | ...................... | 525/296 |
| 5,459,205 A * | 10/1995 | Furukawa et al. | ............ | 525/446 |
| 5,508,333 A * | 4/1996 | Shimizu | ......................... | 524/424 |
| 5,821,290 A * | 10/1998 | Labauze | ......................... | 524/188 |
| 6,627,721 B1 * | 9/2003 | Rodewald et al. | ............ | 526/338 |
| 7,041,761 B2 * | 5/2006 | Halasa et al. | .................. | 526/279 |
| 7,342,070 B2 * | 3/2008 | Tsukimawashi et al. | ...... | 525/105 |
| 2005/0203251 A1 * | 9/2005 | Oshima et al. | ................. | 525/192 |
| 2006/0004143 A1 * | 1/2006 | Inagaki et al. | ................. | 525/192 |
| 2007/0088132 A1 * | 4/2007 | Taniguchi et al. | ............. | 525/342 |
| 2008/0289740 A1 * | 11/2008 | Mori et al. | ...................... | 152/450 |
| 2008/0319151 A1 * | 12/2008 | Oshima | ........................... | 528/14 |
| 2009/0163668 A1 * | 6/2009 | Yamada et al. | .............. | 525/331.9 |
| 2009/0203826 A1 * | 8/2009 | Rachita et al. | ................. | 524/445 |
| 2009/0203843 A1 * | 8/2009 | Fukuoka et al. | ............... | 525/105 |
| 2009/0247692 A1 * | 10/2009 | Oshima et al. | ................. | 524/547 |
| 2010/0056713 A1 * | 3/2010 | Oshima | .......................... | 524/572 |
| 2010/0317852 A1 * | 12/2010 | Tonomura et al. | ............ | 544/229 |
| 2011/0082251 A1 * | 4/2011 | Oshima | .......................... | 524/547 |
| 2011/0237737 A1 * | 9/2011 | Fujii et al. | ...................... | 524/526 |
| 2011/0245407 A1 * | 10/2011 | Ito et al. | ......................... | 524/547 |
| 2011/0275755 A1 * | 11/2011 | Oshima et al. | ................. | 524/548 |

FOREIGN PATENT DOCUMENTS

| | | |
|---|---|---|
| EP | 0334042 A2 | 9/1989 |
| JP | 1-217011 A | 8/1989 |
| JP | 1-217047 A | 8/1989 |
| JP | 07-082422 A | 3/1995 |
| JP | 2003-160603 A | 6/2003 |

\* cited by examiner

*Primary Examiner* — Robert S Loewe
(74) *Attorney, Agent, or Firm* — Sughrue Mion, PLLC

(57) ABSTRACT

Disclosed are a conjugated diene-based polymer from which a polymer composition excellent in fuel cost-saving properties and a tensile strength at break can be obtained. There is provided a conjugated diene-based polymer having a monomer unit based on a conjugated diene, a monomer unit based on a compound represented by the following formula (1), and a monomer unit based on a compound represented by the following formula (2), in which at least one end of the polymer is modified with the following compound (G).

$$V^1\text{-}S^1 \qquad (1)$$

wherein $V^1$ represents a hydrocarbyl group having a polymerizable carbon-carbon double bond, and $S^1$ represents a substituted silyl group.)

$$V^2\text{-}A^2 \qquad (2)$$

wherein $V^2$ represents a hydrocarbyl group having a polymerizable carbon-carbon double bond, and $A^2$ represents a substituted amino group, or a nitrogen-containing heterocyclic group.

Compound (G): at least one kind of compound selected from the compound group consisting of a compound having an amino group optionally having a substituent and a carbonyl group, and a compound having an amino group optionally having a substituent and a thiocarbonyl group.

17 Claims, No Drawings

CONJUGATED DIENE-BASED POLYMER, CONJUGATED DIENE-BASED POLYMER COMPOSITION, AND PROCESS FOR PRODUCING CONJUGATED DIENE-BASED POLYMER

The present invention relates to a conjugated diene-based polymer, a conjugated diene-based polymer composition, and a process for producing a conjugated diene-based polymer.

BACKGROUND OF THE INVENTION

As a rubber composition for an automobile tire, a rubber composition containing a conjugated diene-based polymer such as polybutadiene or a butadiene-styrene copolymer, and a reinforcing agent is used.

In recent years, with increased concern about an environmental problem, requirements of fuel cost-saving properties on an automobile have been increasing, and a rubber composition used in a tire for an automobile has also been required to be excellent in fuel cost-saving properties.

For example, as a polymer enhancing fuel cost-saving properties, and a polymer composition good in fuel cost-saving properties, JP-A 7-82422 has proposed a polymer obtained by living anion-polymerizing butadiene, styrene and dimethylaminomethylstyrene using alkyllithium as a polymerization initiator, and a polymer composition containing the polymer and carbon black. In addition, JP-A 2003-160603 has proposed a conjugated diene-based polymer in which one end of a polymer obtained by copolymerizing butadiene and styrene using alkyllithium as a polymerization initiator is modified with 1-(4-N,N-dimethylaminophenyl)-1-phenylethylene, and a polymer composition of the polymer and a reinforcing agent. JP-A 1-217047 has proposed a conjugated diene-based polymer in which one end of a polymer obtained by copolymerizing butadiene and styrene using alkyllithium as a polymerization initiator is modified with N-dimethylaminopropylacrylamide, and a polymer composition of the polymer and a reinforcing agent. JP-A 1-217011 has proposed a conjugated diene-based polymer in which one end of a polymer obtained by copolymerizing butadiene and styrene using alkyllithium as a polymerization initiator is modified with bis(dimethylamino)methylvinylsilane, and a polymer composition of the polymer and a reinforcing agent.

SUMMARY OF THE INVENTION

However, polymer compositions using the above conventional conjugated diene-based polymer were not necessarily sufficiently satisfactory in fuel cost-saving properties and elongation at break.

Under such circumstances, an object of the present invention is to provide a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

A first aspect of the present invention relates to a conjugated diene-based polymer having a monomer unit based on a conjugated diene, a monomer unit based on a compound represented by the following formula (1), and a monomer unit based on a compound represented by the following formula (2), in which at least one end of the polymer is modified with the following compound (G).

$$V^1\text{-}S^1 \tag{1}$$

wherein $V^1$ represents a hydrocarbyl group having a polymerizable carbon-carbon double bond, and $S^1$ represents a substituted silyl group.

$$V^2\text{-}A^2 \tag{2}$$

wherein $V^2$ represents a hydrocarbyl group having a polymerizable carbon-carbon double bond, and $A^2$ represents a substituted amino group, or a nitrogen-containing heterocyclic group.

Compound (G): at least one kind of compound selected from the compound group consisting of a compound having an amino group optionally having a substituent and a carbonyl group, and a compound having an amino group optionally having a substituent and a thiocarbonyl group.

A second aspect of the present invention relates to a conjugated diene-based polymer composition comprising the conjugated diene-based polymer and a reinforcing agent.

A third aspect of the present invention relates to a process for producing a conjugated diene-based polymer comprising the following step A and step B.

(Step A): a step of polymerizing a monomer component comprising a conjugated diene, a compound represented by the following formula (1) and a compound represented by the following formula (2) with an alkali metal catalyst in a hydrocarbon solvent, to obtain a polymer having an alkali metal derived from the alkali metal catalyst, at least on one end of a polymer chain having a monomer unit based on the conjugated diene, a monomer unit based on the compound represented by the following formula (1) and a monomer unit based on the compound represented by the following formula (2).

$$V^1\text{-}S^1 \tag{1}$$

wherein $V^1$ represents a hydrocarbyl group having a polymerizable carbon-carbon double bond, and $S^1$ represents a substituted silyl group.

$$V^2\text{-}A^2 \tag{2}$$

wherein $V^2$ represents a hydrocarbyl group having a polymerizable carbon-carbon double bond, and $A^2$ represents a substituted amino group, or a nitrogen-containing heterocyclic group.

(Step B): a step of reacting the polymer obtained in the step A with the following compound (G).

Compound (G): at least one kind of compound selected from the compound group consisting of a compound having an amino group optionally having a substituent and a carbonyl group, and a compound having an amino group optionally having a substituent and a thiocarbonyl group.

According to the present invention, there can be provided a conjugated diene-based polymer from which a polymer composition excellent in fuel cost-saving properties and elongation at break can be obtained, a polymer composition containing the conjugated diene-based polymer and a reinforcing agent, and a process for producing the conjugated diene-based polymer.

DETAILED DESCRIPTION OF THE INVENTION

The conjugated diene-based polymer of the present invention is a conjugated diene-based polymer having a monomer unit based on a conjugated diene, a monomer unit based on a compound represented by the following formula (1), and a monomer unit based on a compound represented by the following formula (2), in which at least one end of the polymer is modified with the following compound (G).

$$V^1\text{-}S^1 \tag{1}$$

wherein $V^1$ represents a hydrocarbyl group having a polymerizable carbon-carbon double bond, and $S^1$ represents a substituted silyl group.

(2)

wherein $V^2$ represents a hydrocarbyl group having a polymerizable carbon-carbon double bond, and $A^2$ represents a substituted amino group, or a nitrogen-containing heterocyclic group.

Compound (G): at least one kind of compound selected from the compound group consisting of a compound having an amino group optionally having a substituent and a carbonyl group, and a compound having an amino group optionally having a substituent and a thiocarbonyl group.

Herein, the hydrocarbyl group represents a hydrocarbon residue. The hydrocarbylene group represents a divalent hydrocarbon residue. The nitrogen-containing heterocyclic group represents a group obtained by removing one hydrogen atom from a carbon atom of a heterocyclic ring of a compound having a nitrogen-containing hetrocyclic ring, and the nitrogen-containing heterocyclic ring represents a heterocyclic ring having a nitrogen atom as a heteroatom constituting a ring.

Examples of the conjugated diene include 1,3-butadiene, isoprene, 1,3-pentadiene, 2,3-dimethyl-1,3-butadiene, and 1,3-hexadiene, and one or more kinds of them are used. The conjugated diene is preferably 1,3-butadiene, or isoprene.

$V^1$ in the formula (1) represents a hydrocarbyl group having a polymerizable carbon-carbon double bond.

$V^1$ is preferably a group represented by the following formula (1-V)

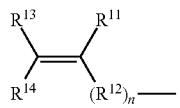

(1-V)

wherein n is an integer of 0 or 1, $R^{11}$, $R^{13}$ and $R^{14}$ each represent independently a hydrogen atom or a hydrocarbyl group, and $R^{12}$ represents a hydrocarbylene group.

In the formula (1-V), n represents an integer of 0 or 1.

Examples of the hydrocarbyl group of $R^{11}$, $R^{13}$ and $R^{14}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, and a 1-methylethenyl group, preferably a vinyl group. Examples of the aryl group include a phenyl group, a methylphenyl group, and an ethylphenyl group, preferably a phenyl group.

$R^{11}$, $R^{13}$ and $R^{14}$ are preferably a hydrogen atom, a methyl group, a vinyl group, or a phenyl group, more preferably a hydrogen group.

Examples of the hydrocarbylene group, represented by $R^{12}$, include an alkylene group, an arylene group, and a group in which an arylene group and an alkylene group are bonded.

Examples of the alkylene group include a methylene group, an ethylene group, and a trimethylene group. Preferable is a methylene group or an ethylene group. Examples of the arylene group include a phenylene group, a naphthylene group, and a biphenylene group. Preferable is a phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded.

In addition, the group in which an arylene group and an alkylene group are bonded is preferably such that a carbon atom of an arylene group of the group is bonded to a carbon atom to which $R^{11}$ of the formula (1-V1) is bonded.

Examples of the group in which a phenylene group and an alkylene group are bonded (phenylene-alkylene group (e.g., a group represented by the following formula (1-R))) include a para-phenylene-alkylene group (e.g., a group represented by the following formula (1-Ra)), a meta-phenylene-alkylene group (e.g., a group represented by the following formula (1-Rb)), and an ortho-phenylene-alkylene group (e.g., a group represented by the following formula (1-Rc)).

(1-R)

wherein d represents an integer of 1 to 10, and $(CH_2)_d$ is a substituent on a benzene ring.

(1-Ra)

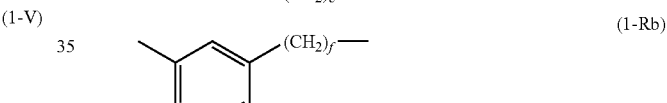

(1-Rb)

(1-Rc)

wherein e, f and g represent an integer of 1 to 10, respectively.

The group in which an arylene group and an alkylene group are bonded (phenylene-alkylene group) is preferably a group in which a phenylene group and an alkylene group are bonded, more preferably a group represented by the above formula (1-Ra), or a group represented by the above formula (1-Rb), further preferably a para-phenylene-methylene group (a group represented by the formula (1-Ra) in which e=1), a meta-phenylene-methylene group (a group represented by the formula (1-Rb) in which f=1), a para-phenylene-ethylene group (a group represented by the formula (1-Ra) in which e=2), or a meta-phenylene-ethylene group (a group represented by the formula (1-Rb) in which f=2).

Examples of the group represented by the formula (1-V) include the following groups.

Examples of the group in which $R^{11}$, $R^{13}$, $R^{14}$ are a hydrogen atom include a vinyl group, a vinylmethyl group, a vinylethyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group.

Examples of the group in which $R^{11}$ is a methyl group, and $R^{13}$ and $R^{14}$ are a hydrogen atom include an isopropenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of the group in which $R^{11}$ is a vinyl group, and $R^{13}$ and $R^{14}$ are a hydrogen atom include a 1-methylene-2-propenyl group, and a 2-methylene-3-butenyl group.

Examples of the group in which $R^{11}$ is a phenyl group, and $R^{13}$ and $R^{14}$ are a hydrogen atom include a 4-(1-phenylvinyl) phenyl group, a 3-(1-phenylvinyl)phenyl group, and a 2-(1-phenylvinyl)phenyl group.

Examples of the group in which $R^{11}$ is a hydrogen atom, $R^{13}$ is a methyl group, and $R^{14}$ is a hydrogen atom include a 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (1-V) is preferably a group represented by the following formula (1-V1).

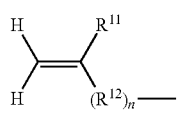

(1-VI)

wherein $R^{11}$ is a hydrogen atom or a hydrocarbyl group, n is an integer of 0 or 1, and $R^{12}$ is a hydrocarbylene group.)

The group represented by the formula (1-V1) is preferably, as a group in which $R^{11}$ is a hydrogen atom, a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group; as a group in which $R^{11}$ is a methyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group or a 2-(3-isopropenylphenyl)ethyl group; as a group in which $R^{11}$ is a vinyl group, a 1-methylene-2-propenyl group, or a 2-methylene-3-butenyl group; as a group in which $R^{11}$ is a phenyl group, a 4-(1-phenylvinyl)phenyl group.

The group represented by the formula (1-V1) is further preferably a vinyl group.

$S^1$ in the formula (1) represents a substituted silyl group.

Examples of the substituted silyl group represented by $S^1$ include a silyl group substituted with a substituent such as a hydrocarbyl group optionally having a substituent, a hydrocarbyloxy group, and a substituted amino group. Substituents bonded to a silicon atom may be the same or different.

The substituted silyl group represented by $S^1$ is preferably a group represented by the following formula (1-S).

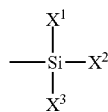

(1-S)

wherein $X^1$, $X^2$ and $X^3$ each represent independently a substituted amino group, or a hydrocarbyl group optionally having a substituent, wherein at least one of $X^1$, $X^2$ and $X^3$ is a substituted amino group.

Examples of the hydrocarbyl group optionally having a substituent of $X^1$, $X^2$ and $X^3$ include hydrocarbyl groups optionally having an oxygen atom, a nitrogen atom and/or a silicon atom.

Examples of the hydrocarbyl group of $X^1$, $X^2$ and $X^3$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group. Examples of the hydrocarbyl group preferably include an alkyl group.

Examples of the hydrocarbyl group having an oxygen atom of $X^1$, $X^2$ and $X^3$ include alkoxyalkyl groups such as a methoxymethyl group, a methoxyethyl group, an ethoxymethyl group, and an ethoxyethyl group.

Examples of the hydrocarbyl group having a nitrogen atom of $X^1$, $X^2$ and $X^3$ include dialkylaminoalkyl groups such as a dimethylaminomethyl group, a dimethylaminoethyl group, a diethylaminomethyl group, and a diethylaminoethyl group.

Examples of the hydrocarbyl group having a silicon atom of $X^1$, $X^2$ and $X^3$ include trialkylsilylalkyl groups such as a trimethylsilylmethyl group, a trimethylsilylethyl group, a triethylsilylmethyl group, and a triethylsilylethyl group.

The hydrocarbyl group optionally having a substituent of $X^1$, $X^2$ and $X^3$ has preferably 1 to 10, more preferably 1 to 4 carbon atoms.

The hydrocarbyl group optionally having a substituent of $X^1$, $X^2$ and $X^3$ is preferably an alkyl group or an alkoxyalkyl group. The alkyl group is preferably an alkyl group having 1 to 4 carbon atoms, more preferably a methyl group or an ethyl group. The alkoxyalkyl group is preferably an alkoxyalkyl group having 2 to 4 carbon atoms.

The substituted amino group of $X^1$, $X^2$ and $X^3$ is preferably a group represented by the following formula (1-X).

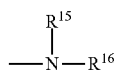

(1-X)

wherein $R^{15}$ and $R^{16}$ each represent a hydrocarbyl group, or a trihydrocarbylsilyl group, or $R^{15}$ and $R^{16}$ are bonded to represent a hydrocarbylene group optionally having a nitrogen atom and/or an oxygen atom as a hetero atom, or $R^{15}$ and $R^{16}$ are one group, and represent a group which bonds to a nitrogen atom with a double bond.

Examples of the hydrocarbyl group of $R^{15}$ and $R^{16}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group.

The hydrocarbyl group of $R^{15}$ and $R^{16}$ has preferably 1 to 10, more preferably 1 to 4, further preferably 1 to 2 carbon atoms.

The hydrocarbyl group of $R^{15}$ and $R^{16}$ is preferably an alkyl group, more preferably a linear alkyl group.

Examples of the trihydrocarbylsilyl group of $R^{15}$ and $R^{16}$ include trialkylsilyl groups such as a trimethylsilyl group, a triethylsilyl group, a triisopropylsilyl group, and a tert-butyldimethylsilyl group.

The trihydrocarbylsilyl group of $R^{15}$ and $R^{16}$ is preferably a trialkylsilyl group having 3 to 9 carbon atoms, more preferably a trialkylsilyl group in which an alkyl group bonded to a silicon atom is an alkyl group having 1 to 3 carbon atoms, further preferably a trimethysilyl group.

Examples of the hydrocarbylene group optionally having a nitrogen atom and/or an oxygen atom as a hetero atom in which $R^{15}$ and $R^{16}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{15}$ and $R^{16}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{15}$ and $R^{16}$ are bonded is preferably a hydrocarbylene group, more preferably an alkylene group, further preferably a polymethylene group.

Examples of one group in which $R^{15}$ and $R^{16}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{15}$ and $R^{16}$ bond to a nitrogen atom with a double bond has preferably 2 to 20, more preferably 2 to 6 carbon atoms.

$R^{15}$ and $R^{16}$ are preferably an alkyl group, a trialkylsilyl group, or an alkylene group in which $R^{15}$ and $R^{16}$ are bonded, more preferably an alkyl group.

Examples of the group represented by the formula (1-X) include a non-cyclic amino group, and a cyclic amino group.

Examples of the non-cyclic amino group include a dialkylamino group, and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl) amino group, a di(tert-butyl)amino group, and an ethylmethylamino group. Examples of the bis(trialkylsilyl)amino group include a bis(trimethylsilyl)amino group, and a bis(t-butyldimethylsilyl)amino group.

Examples of the non-cyclic amino group include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the cyclic amino group include 1-polymethyleneimino groups such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group, and a 1-dodecamethyleneimino group. In addition, examples thereof include a 1-pyrrolyl group, a 1-pyrazolidinyl group, a 1-imidazolidinyl group, a 1-pyrazolyl group, a 1-imidazolyl group, a 4,5-dihydro-1-imidazolyl group, a 1-piperazinyl group, and a morpholino group.

The group represented by the formula (1-X) is preferably a non-cyclic amino group, more preferably a dialkylamino group. The dialkylamino group is preferably a dimethylamino group, a diethylamino group, a di(n-propyl)amino group, or a di(n-butyl)amino group, more preferably a dimethylamino group, or a diethylamino group.

At least one of $X^1$, $X^2$ and $X^3$ in the formula (1) is a substituted amino group, preferably two or more of $X^1$, $X^2$ and $X^3$ are substituted amino groups, more preferably, two of $X^1$, $X^2$ and $X^3$ are substituted amino groups.

Examples of the compound represented by the formula (1) in which $V^1$ is a group represented by the formula (1-V1), $S^1$ is a group represented by the formula (1-S), $R^{11}$ in the formula (1-V1) is a hydrogen atom, and one of $X^1$, $X^2$ and $X^3$ in the formula (1-S) is a dialkylamino group include the following compounds.

Compounds in which n in the formula (1-V1) is 0:
(dimethylamino)dimethylvinylsilane,
(diethylamino)dimethylvinylsilane,
(di-n-propylamino)dimethylvinylsilane,
(di-n-butylamino)dimethylvinylsilane,
(dimethylamino)diethylvinylsilane,
(diethylamino)diethylvinylsilane,
(di-n-propylamino)diethylvinylsilane,
(di-n-butylamino)diethylvinylsilane.

Compounds in which n in the formula (1-V1) is 1:
(dimethylamino)dimethyl-4-vinylphenylsilane,
(dimethylamino)dimethyl-3-vinylphenylsilane,
(diethylamino)dimethyl-4-vinylphenylsilane,
(diethylamino)dimethyl-3-vinylphenylsilane,
(di-n-propylamino)dimethyl-4-vinylphenylsilane,
(di-n-propylamino)dimethyl-3-vinylphenylsilane,
(di-n-butylamino)dimethyl-4-vinylphenylsilane,
(di-n-butylamino)dimethyl-3-vinylphenylsilane,
(dimethylamino)diethyl-4-vinylphenylsilane,
(dimethylamino)diethyl-3-vinylphenylsilane,
(diethylamino)diethyl-4-vinylphenylsilane,
(diethylamino)diethyl-3-vinylphenylsilane,
(di-n-propylamino)diethyl-4-vinylphenylsilane,
(di-n-propylamino)diethyl-3-vinylphenylsilane,
(di-n-butylamino)diethyl-4-vinylsilane,
(di-n-butylamino)diethyl-3-vinylphenylsilane.

Examples of the compound represented by the formula (1) in which $V^1$ is a group represented by the formula (1-V1), $S^1$ is a group represented by the formula (1-S), $R^{11}$ in the formula (1-V1) is a hydrogen atom, and two of $X^1$, $X^2$ and $X^3$ in the formula (1-S) are a dialkylamino group include the following compounds.

Compounds in which n in the formula (1-V1) is 0:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.

Compounds in which n in the formula (1-V1) is 1:
bis(dimethylamino)methyl-4-vinylphenylsilane,
bis(dimethylamino)methyl-3-vinylphenylsilane,
bis(diethylamino)methyl-4-vinylphenylsilane,
bis(diethylamino)methyl-3-vinylphenylsilane,
bis(di-n-propylamino)methyl-4-vinylphenylsilane,
bis(di-n-propylamino)methyl-3-vinylphenylsilane,
bis(di-n-butylamino)methyl-4-vinylphenylsilane,
bis(di-n-butylamino)methyl-3-vinylphenylsilane,
bis(dimethylamino)ethyl-4-vinylphenylsilane,
bis(dimethylamino)ethyl-3-vinylphenylsilane,
bis(diethylamino)ethyl-4-vinylphenylsilane,
bis(diethylamino)ethyl-3-vinylphenylsilane,
bis(di-n-propylamino)ethyl-4-vinylphenylsilane,
bis(di-n-propylamino)ethyl-3-vinylphenylsilane,
bis(di-n-butylamino)ethyl-4-vinylphenylsilane,
bis(di-n-butylamino)ethyl-3-vinylphenylsilane.

Examples of the compound represented by the formula (1) in which $V^1$ is a group represented by the formula (1-V1), $S^1$ is a group represented by the formula (1-S), $R^{11}$ in the formula (1-V1) is a methyl group, and two of $X^1$, $X^2$ and $X^3$ in the formula (1-S) are a dialkylamino group include the following compounds.
Compounds in which n in the formula (1-V1) is 1:
bis(dimethylamino)methyl-4-isopropenylphenylsilane,
bis(dimethylamino)methyl-3-isopropenylphenylsilane,
bis(diethylamino)methyl-4-isopropenylphenylsilane,
bis(diethylamino)methyl-3-isopropenylphenylsilane,
bis(di-n-propylamino)methyl-4-isopropenylphenylsilane,
bis(di-n-propylamino)methyl-3-isopropenylphenylsilane,
bis(di-n-butylamino)methyl-4-isopropenylphenylsilane,
bis(di-n-butylamino)methyl-3-isopropenylphenylsilane,
bis(dimethylamino)ethyl-4-isopropenylphenylsilane,
bis(dimethylamino)ethyl-3-isopropenylphenylsilane,
bis(diethylamino)ethyl-4-isopropenylphenylsilane,
bis(diethylamino)ethyl-3-isopropenylphenylsilane,
bis(di-n-propylamino)ethyl-4-isopropenylphenylsilane,
bis(di-n-propylamino)ethyl-3-isopropenylphenylsilane,
bis(di-n-butylamino)ethyl-4-isopropenylphenylsilane,
bis(di-n-butylamino)ethyl-3-isopropenylphenylsilane.

Examples of the compound represented by the formula (1) in which $V^1$ is a group represented by the formula (1-V1), $S^1$ is a group represented by the formula (1-S), $R^{11}$ in the formula (1-V1) is a vinyl group, and two of $X^1$, $X^2$ and $X^3$ in the formula (1-S) are a dialkylamino group include the following compounds.
Compound in which n in the formula (1-V1) is 0:
bis(dimethylamino)methyl(1-methylene-2-propenyl)silane,
bis(diethylamino)methyl(1-methylene-2-propenyl)silane,
bis(di-n-propylamino)methyl(1-methylene-2-propenyl)silane,
bis(di-n-butylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(di-n-propylamino)ethyl(1-methylene-2-propenyl)silane,
bis(di-n-butylamino)ethyl(1-methylene-2-propenyl)silane.

Examples of the compound represented by the formula (1) in which $V^1$ is a group represented by the formula (1-V1), $S^1$ is a group represented by the formula (1-S), $R^{11}$ in the formula (1-V1) is a phenyl group, and two of $X^1$, $X^2$ and $X^3$ in the formula (1-S) are a dialkylamino group include the following compounds.
Compounds in which n in the formula (1-V) is 1:
1-(4-bis(dimethylamino)methylsilyl)-1-phenylethylene,
1-(4-bis(diethylamino)methylsilyl)-1-phenylethylene,
1-(4-bis(di-n-propylamino)methylsilyl)-1-phenylethylene,
1-(4-bis(di-n-butylamino)methylsilyl)-1-phenylethylene,
1-(4-bis(dimethylamino)ethylsilyl)-1-phenylethylene,
1-(4-bis(diethylamino)ethylsilyl)-1-phenylethylene,
1-(4-bis(di-n-propylamino)ethylsilyl)-1-phenylethylene,
1-(4-bis(di-n-butylamino)ethylsilyl)-1-phenylethylene.

Examples of the compound represented by the formula (1) in which $V^1$ is a group represented by the formula (1-V), $S^1$ is a group represented by the formula (1-S), $R^{11}$ in the formula (1-V1) is a hydrogen atom, and three of $X^1$, $X^2$ and $X^3$ in the formula (1-S) are a dialkylamino group include the following compounds.
Compounds in which n in the formula (1-V1) is 0:
tris(dimethylamino)vinylsilane,
tris(diethylamino)vinylsilane,
tris(di-n-propylamino)vinylsilane,
tris(di-n-butylamino)vinylsilane.
Compounds in which n in the formula (1-V1) is 1:
tris(dimethylamino)-4-vinylphenylsilane,
tris(dimethylamino)-3-vinylphenylsilane,
tris(diethylamino)-4-vinylphenylsilane,
tris(diethylamino)-3-vinylphenylsilane,
tris(di-n-propylamino)-4-vinylphenylsilane,
tris(di-n-propylamino)-3-vinylphenylsilane,
tris(di-n-butylamino)-4-vinylphenylsilane,
tris(di-n-butylamino)-3-vinylphenylsilane.

Examples of the compound represented by the formula (1) in which $V^1$ is a group represented by the formula (1-V1), $S^1$ is a group represented by the formula (1-S), $R^{11}$ in the formula (1-V1) is a methyl group, and three of $X^1$, $X^2$ and $X^3$ in the formula (1-S) are a dialkylamino group include the following compounds.
Compound in which n in the formula (1-V1) is 1:
tris(dimethylamino)-4-isopropenylphenylsilane,
tris(dimethylamino)-3-isopropenylphenylsilane,
tris(diethylamino)-4-isopropenylphenylsilane,
tris(diethylamino)-3-isopropenylphenylsilane,
tris(di-n-propylamino)-4-isopropenylphenylsilane,
tris(di-n-propylamino)-3-isopropenylphenylsilane,
tris(di-n-butylamino)-4-isopropenylphenylsilane,
tris(di-n-butylamino)-3-isopropenylphenylsilane.

Examples of the compound represented by the formula (1) in which $V^1$ is a group represented by the formula (1-V1), $S^1$ is a group represented by the formula (1-S), $R^{11}$ in the formula (1-V1) is a vinyl group, and three of $X^1$, $X^2$ and $X^3$ in the formula (1-S) are a dialkylamino group include the following compounds.
Compounds in which n in the formula (1-V1) is 0:
tris(dimethylamino)(1-methylene-2-propenyl)silane,
tris(diethylamino)(1-methylene-2-propenyl)silane,
tris(di-n-propylamino)(1-methylene-2-propenyl)silane,
tris(di-n-butylamino)(1-methylene-2-propenyl)silane.

Examples of the compound represented by the formula (1) in which $V^1$ is a group represented by the formula (1-V1), $S^1$ is a group represented by the formula (1-S), $R^{11}$ in the formula (1-V1) is a phenyl group, and three of $X^1$, $X^2$ and $X^3$ in the formula (1-S) are a dialkylamino group include the following compounds.
Compounds in which n in the formula (1-V1) is 1:
1-(4-tris(dimethylamino)silyl)-1-phenylethylene,
1-(4-tris(diethylamino)silyl)-1-phenylethylene,
1-(4-tris(di-n-propylamino)methylsilyl)-1-phenylethylene,
1-(4-tris(di-n-butylamino)methylsilyl)-1-phenylethylene.

The compound represented by the formula (1) is preferably a compound in which $V^1$ is a group represented by the formula (1-V1), and $S^1$ is a group represented by the formula (1-S), more preferably a compound in which two of $X^1$, $X^2$ and $X^3$ in the formula (1-S) are a dialkylamino group, further preferably a compound in which $R^{11}$ in the formula (1-V1) is a hydrogen atom, and n in the formula (1-V1) is 0. Further preferable is a compound in which remaining one of $X^1$, $X^2$ and $X^3$ is an alkyl group or an alkoxyalkyl group. Most preferable is:
bis(dimethylamino)methylvinylsilane,
bis(diethylamino)methylvinylsilane,
bis(di-n-propylamino)methylvinylsilane,
bis(di-n-butylamino)methylvinylsilane,
bis(dimethylamino)ethylvinylsilane,
bis(diethylamino)ethylvinylsilane,
bis(di-n-propylamino)ethylvinylsilane,
bis(di-n-butylamino)ethylvinylsilane.

$V^2$ in the formula (2) represents a hydrocarbyl group having a polymerizable carbon-carbon double bond.

$V^2$ is preferably a group represented by the following formula (2-V).

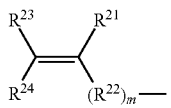

(2-V)

wherein m is 0 or 1, $R^{21}$, $R^{23}$ and $R^{24}$ each represent independently a hydrogen atom or a hydrocarbyl group, and $R^{22}$ represents a hydrocarbylene group.

In the formula (2-V), m represents 0 or 1.

Examples of the hydrocarbyl group of $R^{21}$, $R^{23}$ and $R^{24}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, a 1-methylethenyl group, preferably a vinyl group. Examples of the aryl group include a phenyl group, a methylphenyl group, and an ethylphenyl group, preferably a phenyl group.

$R^{21}$, $R^{23}$ and $R^{24}$ are preferably a hydrogen atom, a methyl group, a vinyl group, or a phenyl group, more preferably a hydrogen atom.

Examples of the hydrocarbylene group of $R^{22}$ include an alkylene group, an arylene group, and a group in which an arylene group and an alkylene group are bonded.

Examples of the alkylene group include a methylene group, an ethylene group, and a trimethylene group. Preferable is a methylene group or an ethylene group. Examples of the arylene group include a phenylene group, a naphtylene group, and a biphenylene group. Preferable is a phenylene group. More preferable is a para-phenylene group, or a meta-phenylene group.

Examples of the group in which an arylene group and an alkylene group are bonded include a group in which a phenylene group and an alkylene group are bonded, a group in which a naphthylene group and an alkylene group are bonded, and a group in which a biphenylene group and an alkylene group are bonded.

In addition, the group in which an arylene group and an alkylene group are bonded is preferably such that a carbon atom of an arylene group of the group is bonded to a carbon atom to which $R^{21}$ of the formula (2-V) is bonded.

Examples of the group in which a phenylene group and an alkylene group are bonded (phenylene-alkylene group (e.g., a group represented by the following formula (2-R))) include a para-phenylene-alkylene group (e.g., a group represented by the following formula (2-Ra)), a meta-phenylene-alkylene group (e.g., a group represented by the following formula (2-Rb)), and an ortho-phenylene-alkylene group (e.g., a group represented by the following formula (2-Rc)), depending on a position of a carbon atom on a benzene ring from which a hydrogen atom has been removed, and a position of a carbon atom on a benzene ring to which an alkylene group bonds.

(2-R)

wherein h represents an integer of 1 to 10, and $(CH_2)_h$ is a substituent on a benzene ring.

(2-Ra)

(2-Rb)

(2-Rc)

wherein i, j and k represent an integer of 1 to 10, respectively.

Here, h in the formula (2-R), i in the formula (2-Ra), j in the formula (2-Rb), and k in the formula (2-Rc) are preferably 1 to 5, more preferably 1 to 2, further preferably 1.

The group in which an arylene group and an alkylene group are bonded (phenylene-alkylene group) is preferably a group in which a phenylene group and an alkylene group are bonded, more preferably a group represented by the above formula (2-Ra), or a group represented by the above formula (2-Rb), further preferably a para-phenylene-methylene group (a group represented by the formula (2-Ra) in which i=1), a meta-phenylene-methylene group (a group represented by the formula (2-Rb) in which j=1), a para-phenylene-ethylene group (a group represented by the formula (2-Ra) in which i=2), or a meta-phenylene-ethylene group (a group represented by the formula (2-Rb) in which j=2), particularly preferably a para-phenylene-methylene group (a group represented by the formula (2-Ra) in which i=1), or a meta-phenylene-methylene group (a group represented by the formula (2-Rb) in which j=1).

Examples of the group represented by the formula (2-V) include following groups.

Examples of the group in which $R^{21}$, $R^{23}$ and $R^{24}$ are a hydrogen atom include a vinyl group, a vinylmethyl group, a vinylethyl group, a 4-vinylphenyl group, a 3-vinylphenyl group, a (4-vinylphenyl)methyl group, a 2-(4-vinylphenyl) ethyl group, a (3-vinylphenyl)methyl group, and a 2-(3-vinylphenyl)ethyl group.

Examples of the group in which $R^{21}$ is a methyl group, and $R^{23}$ and $R^{24}$ are a hydrogen atom include an isopropenyl group, a methallyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of the group in which $R^{21}$ is a vinyl group, and $R^{23}$ and $R^{24}$ are a hydrogen atom include a 1-methylene-2-propenyl group, and a 2-methylene-3-butenyl group.

Examples of the group in which $R^{21}$ is a phenyl group, and $R^{23}$ and $R^{24}$ are a hydrogen atom include a 4-(1-phenylvinyl)phenyl group, a 3-(1-phenylvinyl)phenyl group, and a 2-(1-phenylvinyl)phenyl group.

Examples of the group in which $R^{21}$ is a hydrogen atom, $R^{23}$ is a methyl group, and $R^{24}$ is a hydrogen atom include a 1-propenyl group, a crotyl group, a 4-(1-propenyl)phenyl group, a 4-(1-propenyl)phenylmethyl group, a 2-{4-(1-propenyl)phenyl}ethyl group, a 3-(1-propenyl)phenyl group, a 3-(1-propenyl)phenylmethyl group, and a 2-{3-(1-propenyl)phenyl}ethyl group.

The group represented by the formula (2-V) is preferably a group represented by the following formula (2-V1).

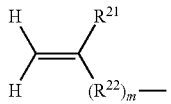

(2-VI)

wherein $R^{21}$-represents a hydrogen atom or a hydrocarbyl group, m is an integer of 0 or 1, and $R^{22}$ represents a hydrocarbylene group.

The group represented by the formula (2-V1) is preferably, as a group in which $R^{21}$ is a hydrogen atom, a vinyl group, a 4-vinylphenyl group, a 3-vinylphenyl group, a (4-vinylphenyl)methyl group, a 2-(4-vinylphenyl)ethyl group, a (3-vinylphenyl)methyl group, or a 2-(3-vinylphenyl)ethyl group; as a group in which $R^{21}$ is a methyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, or a 2-(3-isopropenylphenyl)ethyl group; as a group in which $R^{21}$ is a vinyl group, a 1-methylene-2-propenyl group, or a 2-methylene-3-butenyl group; as a group in which $R^{21}$ is a phenyl group, a 4-(1-phenylvinyl)phenyl group.

The group represented by the formula (2-V1) is further preferably a vinyl group, a 4-vinylphenyl group, a (4-vinylphenyl)methyl group, or a 4-(1-phenylvinyl)phenyl group.

In the formula (2), $A^2$ represents a substituted amino group, or a nitrogen-containing heterocyclic group.

The substituted amino group of $A^2$ is preferably a group represented by the following formula (2-A).

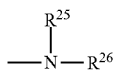

(2-A)

wherein $R^{25}$ and $R^{26}$ each independently represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero group, or $R^{25}$ and $R^{26}$ are one group, and represent a group which bonds to a nitrogen atom with a double bond.

Examples of the hydrocarbyl group of $R^{25}$ and $R^{26}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group.

The hydrocarbyl group of $R^{25}$ and $R^{26}$ has preferably 1 to 10, more preferably 1 to 4, further preferably 1 to 2 carbon atoms.

The hydrocarbyl group of $R^{25}$ and $R^{26}$ is preferably an alkyl group, or an alkenyl group, more preferably an alkyl group, further preferably a linear alkyl group.

Examples of the trihydrocarbylsilyl group of $R^{25}$ and $R^{26}$ include trialkylsilyl groups such as a trimethylsilyl group, a triethylsilyl group, a triisopropylsilyl group, and a tert-butyldimethylsilyl group.

The trihydrocarbylsilyl group of $R^{25}$ and $R^{26}$ is preferably a trialkylsilyl group having 3 to 9 carbon atoms, more preferably a trialkylsilyl group in which an alkyl group bonded to a silicon atom is an alkyl group having 1 to 4 carbon atoms, further preferably a trimethylsilyl group.

Examples of the hydrocarbylene group optionally having a nitrogen atom and/or an oxygen atom as a hetero atom in which $R^{25}$ and $R^{26}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{25}$ and $R^{26}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{25}$ and $R^{26}$ are bonded is preferably a hydrocarbylene group, more preferably an alkylene group, further preferably a polymethylene group.

Examples of one group in which $R^{25}$ and $R^{26}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{25}$ and $R^{26}$ bond to a nitrogen atom with a double bond has preferably 2 to 20, more preferably 2 to 6 carbon atoms.

$R^{25}$ and $R^{26}$ are preferably a hydrocarbyl group, a trihydrocarbylsilyl group, or a hydrocarbylene group in which $R^{25}$ and $R^{26}$ are bonded.

Examples of the group represented by the formula (2-A) include a non-cyclic amino group, and a cyclic amino group.

Examples of the non-cyclic amino group include a dialkylamino group, and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl)

amino group, a di(tert-butyl)amino group, and an ethylmethylamino group. Examples of the bis(trialkylsilyl)amino group include a bis(trimethylsilyl)amino group, and a bis(tert-butyldimethylsilyl)amino group.

Examples of the non-cyclic amino group include an ethylideneamino group, a 1-methylpropylideneamino group, a 1,3-dimethylbutylideneamino group, a 1-methylethylideneamino group and a 4-N,N-dimethylaminobenzylideneamino group.

Examples of the cyclic amino group include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (2-A) is preferably a group in which $R^{25}$ and $R^{26}$ are hydrocarbyl groups, a group in which $R^{25}$ and $R^{26}$ are trihydrocarbylsilyl groups, or a group in which $R^{25}$ and $R^{26}$ are bonded to form a hydrocarbylene group. More preferable is a group in which $R^{25}$ and $R^{26}$ are linear alkyl groups, a group in which $R^{25}$ and $R^{26}$ are trialkylsilyl groups, or a group in which $R^{25}$ and $R^{26}$ are bonded to form a polymethylene group.

The group represented by the formula (2-A) is further preferably a dimethylamino group, a diethylamino group, a di(n-propyl)amino group, a di(n-butyl)amino group, a bis(trimethylsilyl)amino group, a bis(tert-butyldimethylsilyl)amino group, a 1-pyrrolidinyl group, a 1-piperidinyl group, or a 1-hexamethyleneimino group.

Examples of the nitrogen-containing heterocyclic group of $A^2$ include a nitrogen-containing alicyclic heterocyclic group, and a nitrogen-containing aromatic heterocyclic group. Herein, the nitrogen-containing alicyclic heterocyclic group represents a group in which one hydrogen atom has been removed from a carbon atom of a heterocycle of a compound having a nitrogen-containing alicyclic heterocycle, and the nitrogen-containing alicyclic heterocycle represents an alicyclic heterocycle having a nitrogen atom as a hetero atom constituting a ring. The nitrogen-containing heterocyclic group represents a group in which one hydrogen atom has been removed from a carbon atom of a heterocycle of a compound having a nitrogen-containing heterocycle, and the nitrogen-containing heterocycle represents a heterocycle having a nitrogen atom as a hetero atom constituting a ring.

Examples of the nitrogen-containing alicyclic heterocyclic group of $A^2$ include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-containing alicyclic heterocyclic group having only a nitrogen atom as a hetero atom constituting a ring include a group having an aziridine ring, a group having an azetidine ring, a group having a pyrrolidine ring, a group having a piperidine ring, a group having a hexamethyleneimine ring, a group having an imidazolidine ring, a group having a piperazine ring, and a group having a pyrazolidine ring.

Examples of the group having an aziridine ring include an 1-alkyl-2-aziridinyl group.

Examples of the group having an azetidine ring include an 1-alkyl-2-azetidinyl group, and an 1-alkyl-3-azetidinyl group.

Examples of the group having a pyrrolidine ring include an 1-alkyl-2-pyrrolidinyl group, and an 1-alkyl-3-pyrrolidinyl group.

Examples of the group having a piperidine ring include an 1-alkyl-2-piperidinyl group, an 1-alkyl-3-piperidinyl group, and an 1-alkyl-4-piperidinyl group.

Examples of the group having a hexamethyleneimine ring include an 1-alkyl-2-hexamethyleneinimo group, an 1-alkyl-3-hexamethyleneimino group, and an 1-alkyl-4-hexamethyleneimino group.

Examples of the group having an imidazolidine ring include a 1,3-dialkyl-2-imidazolidyl group, and a 1,3-dialkyl-4-imidazolidyl group.

Examples of the group having a piperazine ring include a 1,4-dialkyl-2-piperazinyl group.

Examples of the group having a pyrazolidine ring include a 1,2-dialkyl-3-pyrazolidyl group, and a 1,2-dialkyl-4-pyrazolidyl group.

Examples of the nitrogen-containing alicyclic heterocyclic group having a nitrogen atom and an oxygen atom as a hetero atom constituting a ring include a group having a morpholine ring and a group having an isooxazolidine ring.

Examples of the group having a morpholine ring include an 1-alkyl-2-morpholino group, and an 1-alkyl-3-morpholino group.

Examples of the group having an isooxazolidine ring include an 1-alkyl-3-isooxazolidinyl group, an 1-alkyl-4-isooxazolidinyl group, and an 1-alkyl-5-isooxazolidinyl group.

Examples of the nitrogen-containing alicyclic heterocyclic group having a nitrogen atom and a sulfur atom as a hetero atom constituting a ring include a group having a thiomorpholine ring, and a group having an isothiazolidine ring.

Examples of the group having a thiomorpholine ring include an 1-alkyl-2-thiomorpholino group, and an 1-alkyl-3-thiomorpholino group.

Examples of the group having an isothiazolidine ring include an 1-alkyl-3-isothiazolidinyl group, an 1-alkyl-4-isothiazolidinyl group, and an 1-alkyl-5-isothiazolidinyl group.

The nitrogen-containing alicyclic heterocyclic group of $A^2$ is preferably a group having only a nitrogen atom as a hetero atom constituting a ring. In addition, the nitrogen-containing alicyclic heterocyclic group has preferably 4 to 10 carbon atoms.

Examples of the nitrogen-containing aromatic heterocyclic group of $A^2$ include a group having only a nitrogen atom as a hetero atom constituting a ring, a group having a nitrogen atom and an oxygen atom as a hetero atom constituting a ring, and a group having a nitrogen atom and a sulfur atom as a hetero atom constituting a ring.

Examples of the nitrogen-aromatic heterocyclic group having only a nitrogen atom as a hetero atom constituting a ring include a group having a pyrrole ring, a group having an imidazole ring, a group having a pyrazole ring, a group having a pyridine ring, a group having a pyridazine ring, a group having a pyrimidine ring, a group having a pyrazine ring, a group having a quinoline ring, a group having an isoquinoline ring, a group having a cinnoline ring, a group having a quinazoline ring, and a group having a phthalazine ring.

Examples of the group having a pyrrole ring include a 2-pyrrolyl group, a 3-pyrrolyl group, a 2-(1-methylpyrrolyl) group, and a 3-(1-methylpyrrolyl) group.

Examples of the group having an imidazole ring include a 2-imidazolyl group, a 4-imidazolyl group, a 5-imidazolyl group, a 2-(1-methylimidazolyl) group, a 4-(1-methylimidazolyl) group, and a 5-(1-methylimidazolyl) group.

Examples of the group having a pyrazole ring include a 3-pyrazolyl group, a 4-pyrazolyl group, a 5-pyrazolyl group, a 3-(1-methylpyrazolyl) group, a 4-(1-methylpyrazolyl) group and a 5-(1-methylpyrazolyl) group.

Examples of the group having a pyridine ring include a 2-pyridyl group, a 3-pyridyl group, and a 4-pyridyl group.

Examples of the group having a pyridazine ring include a 3-pyridazyl group, and a 4-pyridazyl group.

Examples of the group having a pyrimidine ring include a 2-pyrimidyl group, a 4-pyrimidyl group, and a 5-pyrimidyl group.

Examples of the group having a pyrazine group include a 2-pyrazyl group.

Examples of the group having a quinoline ring include a 2-quinolyl group, a 3-quinolyl group, a 4-quinolyl group, a 5-quinolyl group, a 6-quinolyl group, a 7-quinolyl group, and an 8-quinolyl group.

Examples of the group having an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group.

Examples of the group having a cinnoline ring include a 3-cinnolinyl group, a 4-cinnolinyl group, a 5-cinnolinyl group, a 6-cinnolinyl group, a 7-cinnolinyl group, and an 8-cinnolinyl group.

Examples of the group having a quinazoline ring include a 2-quinazolinyl group, a 4-quinazolinyl group, a 5-quinazolinyl group, a 6-quinazolinyl group, a 7-quinazolinyl group, and an 8-quinazolinyl group.

Examples of the group having a phthalazine ring include a 1-phthalazinyl group, a 5-phthalazinyl group and a 6-phthalazinyl group.

The nitrogen-containing aromatic heterocyclic group having only a nitrogen atom as a hetero atom constituting a ring is preferably the group having an imidazole ring, the group having a pyridine ring, or the group having a quinoline ring.

Examples of the nitrogen-containing aromatic heterocyclic group having a nitrogen atom and an oxygen atom as a hetero atom constituting a ring include a group having an oxazole ring, and a group having an isooxazole ring.

Examples of the group having an oxazole ring include a 2-oxazolyl group, a 4-oxazolyl group, and a 5-oxazolyl group.

Examples of the group having an isooxazole ring include a 3-isooxazolyl group, a 4-isooxazolyl group, and a 5-isooxazolyl group.

The nitrogen-containing aromatic heterocyclic group having a nitrogen atom and an oxygen atom as a hetero atom constituting a ring is preferably the group having an oxazole ring.

Examples of the nitrogen-containing aromatic heterocyclic group having a nitrogen atom and a sulfur atom as a hetero atom constituting a ring include a group having a thiazole ring, and a group having an isothiazole ring.

Examples of the group having a thiazole ring include a 2-thiazolyl group, a 4-thiazolyl group, and a 5-thiazolyl group.

Examples of the group having an isothiazole ring include a 3-isothiazolyl group, a 4-isothiazolyl group, and a 5-isothiazolyl group.

The nitrogen-containing aromatic heterocyclic group having a nitrogen atom and a sulfur atom as a hetero atom constituting a ring is preferably the group having a thiazole ring.

The nitrogen-containing aromatic heterocyclic group of $A^2$ is preferably a nitrogen-containing aromatic heterocyclic group having only a nitrogen atom as a hetero atom constituting a ring, more preferably a group having an imidazole ring, a group having a pyridine ring, or a group having a quinoline ring, further preferably a group having a pyridine ring.

Examples of the compound represented by the formula (2) in which $V^2$ is a group represented by the formula (2-V1), $R^{21}$ in the formula (2-V1) is a hydrogen atom, m is 0, and $A^2$ is a substituted amino group include the following compounds.
1-vinylpyrrolidine,
1-vinylpiperidine,
1-vinylhexamethyleneimine,
1-vinylpiperazine,
1-vinylpyrrole,
1-vinylimidazole,
1-vinylpyrazole,
1-vinylquinoline.

Examples of the compound represented by the formula (2) in which $V^2$ is a group represented by the formula (2-V1), $R^{21}$ is the formula (2-V1) is a hydrogen atom, m is 1, $R^{22}$ is a phenylene group, and $A^2$ is a substituted amino group include the following compounds.
4-N,N-dimethylaminostyrene,
4-N,N-diethylaminostyrene,
4-N,N-di-n-propylaminostyrene,
4-N,N-di-n-butylaminostyrene,
4-N,N-diallylaminostyrene,
4-N,N-bis(trimethylsilyl)aminostyrene,
4-N,N-bis(tert-butyldimethylsilyl)aminostyrene,
4-(1-aziridinyl)styrene,
4-(1-pyrrolidinyl)styrene,
4-(1-piperidinyl)styrene,
4-(1-hexamethyleneimino)styrene,
3-N,N-dimethylaminostyrene,
3-N,N-diethylaminostyrene,
3-N,N-di-n-propylaminostyrene,
3-N,N-di-n-butylaminostyrene,
3-N,N-diallylaminostyrene,
3-N,N-bis(trimethylsilyl)aminostyrene,
3-N,N-bis(tert-butyldimethylsilyl)aminostyrene,
3-(1-aziridinyl)styrene,
3-(1-pyrrolidinyl)styrene,
3-(1-piperidinyl)styrene,
3-(1-hexamethyleneimino)styrene.

Examples of the compound represented by the formula (2) in which $V^2$ is a group represented by the formula (2-V1), $R^{21}$ in the formula (2-V1) is a hydrogen atom, m is 1, $R^{22}$ is a group represented by the formula (2-Ra), and $A^2$ is a substituted amino group include the following compounds.
Compounds in which i in the formula (2-Ra) is 1:
4-N,N-dimethylaminomethylstyrene,
4-N,N-diethylaminomethylstyrene,
4-N,N-di-n-propylaminomethylstyrene,
4-N,N-di-n-butylaminomethylstyrene,
4-N,N-diallylaminomethylstyrene,
4-N,N-bis(trimethylsilyl)aminomethylstyrene,
4-N,N-bis(tert-butyldimethylsilyl)aminomethylstyrene,
4-(1-aziridinyl)methylstyrene,
4-(1-pyrrolidinyl)methylstyrene,
4-(1-piperidinyl)methylstyrene,
4-(1-hexamethyleneimino)methylstyrene,
Compounds in which i in the formula (2-Ra) is 2:
4-N,N-dimethylaminoethylstyrene,
4-N,N-diethylaminoethylstyrene,
4-N,N-di-n-propylaminoethylstyrene,
4-N,N-di-n-butylaminoethylstyrene,
4-N,N-diallylaminoethylstyrene,
4-N,N-bis(trimethylsilyl)aminoethylstyrene,
4-N,N-bis(tert-butyldimethylsilyl)aminoethylstyrene, 4-(1-aziridinyl)ethylstyrene,
4-(1-piperidinyl)ethylstyrene,
4-(1-hexamethyleneimino)ethylstyrene, Examples of the compound represented by the formula (2) in which $V^2$ is a group represented by the formula (2-V1), $R^{21}$ in the formula (2-V1) is a hydrogen atom, m is 1, $R^{22}$ is a group represented by the formula (2-Rb), and $A^2$ is a substituted amino group include the following compounds.

Compounds in which j in the formula (2-Rb) is 1:
3-N,N-dimethylaminomethylstyrene,
3-N,N-diethylaminomethylstyrene,
3-N,N-di-n-propylaminomethylstyrene,
3-N,N-di-n-butylaminomethylstyrene,
3-N,N-diallylaminomethylstyrene,
3-N,N-bis(trimethylsilyl)aminomethylstyrene,
3-N,N-bis(tert-butyldimethylsilyl)aminomethylstyrene,
3-(1-aziridinyl)methylstyrene,
3-(1-pyrrolidinyl)methylstyrene,
3-(1-piperidinyl)methylstyrene,
3-(1-hexamethyleneimino)methylstyrene.

Compounds in which j in the formula (2-Rb) is 2:
3-N,N-dimethylaminoethylstyrene,
3-N,N-diethylaminoethylstyrene,
3-N,N-di-n-propylaminoethylstyrene,
3-N,N-di-n-buytlaminoethylstyrene,
3-N,N-diallylaminoethylstyrene,
3-N,N-bis(trimethylsilyl)aminoethylstyrene,
3-N,N-bis(tert-butyldimethylsilyl)aminoethylstyrene,
3-(1-aziridinyl)ethylstyrene,
3-(1-piperidinyl)ethylstyrene,
3-(1-hexamethyleneimino)ethylstyrene.

Examples of the compound represented by the formula (2) in which $V^2$ is a group represented by the formula (2-V1), $R^{21}$ in the formula (2-V1) is a methyl group, m is 0, and $A^2$ is a substituted amino group include the following compounds.
1-isopropenylpyrrolidine,
1-isopropenylpiperidine,
1-isopropenylhexamethyleneimine,
1-isopropenylpiperazine,
1-isopropenylpyrrole,
1-isopropenylimidazole,
1-isopropenylpyrazole,
isopropenylquinoline.

Examples of the compound represented by the formula (2) in which $V^2$ is a group represented by the formula (2-V1), $R^{21}$ in the formula (2-V1) is a methyl group, m is 1, $R^{22}$ is a phenylene group, and $A^2$ is a substituted amino group include the following compounds.
4-N,N-dimethylaminoisopropenylbenzene,
4-N,N-diethylaminoisopropenylbenzene,
4-N,N-di-n-propylaminoisopropenylbenzene,
4-N,N-di-n-butylaminoisopropenylbenzene,
4-N,N-diallylaminoisopropenylbenzene,
4-N,N-bis(trimethylsilyl)aminoisopropenylbenzene,
4-N,N-bis(tert-butyldimethylsilyl)aminoisopropenylbenzene,
4-(1-aziridinyl)isopropenylbenzene,
4-(1-pyrrolidinyl)isopropenylbenzene,
4-(1-piperidinyl)isopropenylbenzene,
4-(1-hexamethyleneimino)isopropenylbenzene,
3-N,N-dimethylaminoisopropenylbenzene,
3-N,N-diethylaminoisopropenylbenzene,
3-N,N-di-n-propylaminoisopropenylbenzene,
3-N,N-di-n-butylaminoisopropenylbenzene,
3-N,N-diallylaminoisopropenylbenzene,
3-N,N-bis(trimethylsilyl)aminoisopropenylbenzene,
3-N,N-bis(tert-butyldimethylsilyl)aminoisopropenylbenzene,
3-(1-aziridinyl)isopropenylbenzene,
3-(1-pyrrolidinyl)isopropenylbenzene,
3-(1-piperidinyl)isopropenylbenzene,
3-(1-hexamethyleneimino)isopropenylbenzene.

Examples of the compound represented by the formula (2) in which $V^2$ is a group represented by the formula (2-V1), $R^{21}$ in the formula (2-V1) is a methyl group, m is 1, $R^{22}$ is a group represented by the formula (2-Ra), and $A^2$ is a substituted amino group include the following compounds.

Compounds in which i in the formula (2-Ra) is 1:
4-N,N-dimethylaminomethylisopropenylbenzene,
4-N,N-diethylaminomethylisopropenylbenzene,
4-N,N-di-n-propylaminomethylisopropenylbenzene,
4-N,N-di-n-butylaminomethylisopropenylbenzene,
4-N,N-diallylaminomethylisopropenylbenzene,
4-N,N-bis(trimethylsilyl)aminomethylisopropenylbenzene,
4-N,N-bis(tert-butyldimethylsilyl)aminomethylisopropenylbenzene,
4-(1-aziridinyl)methylisopropenylbenzene,
4-(1-pyrrolidinyl)methylisopropenylbenzene,
4-(1-piperidinyl)methylisopropenylbenzene,
4-(1-hexamethyleneimino)methylisopropenylbenzene, Compounds in which i in the formula (2-Ra) is 2:
4-N,N-dimethylaminoethylisopropenylbenzene,
4-N,N-diethylaminoethylisopropenylbenzene,
4-N,N-di-n-propylaminoethylisopropenylbenzene,
4-N,N-di-n-butylaminoethylisopropenylbenzene,
4-N,N-diallylaminoethylisopropenylbenzene,
4-N,N-bis(trimethylsilyl)aminoethylisopropenylbenzene,
4-N,N-bis(tert-butyldimethylsilyl)aminoethylisopropenylbenzene,
4-(1-aziridinyl)ethylisopropenylbenzene,
4-(1-pyrrolidinyl)ethylisopropenylbenzene,
4-(1-piperidinyl)ethylisopropenylbenzene,
4-(1-hexamethyleneimino)ethylisopropenylbenzene, Examples of the compound represented by the formula (2) in which $V^2$ is a group represented by the formula (2-V1), $R^{21}$ in the formula (2-V1) is a methyl group, m is an integer of 1, and $R^{22}$ is a group represented by the formula (2-Rb), and $A^2$ is a substituted amino group include the following compounds.

Compounds in which j in the formula (2-Rb) is 1:
3-N,N-dimethylaminomethylisopropenylbenzene,
3-N,N-diethylaminomethylisopropenylbenzene,
3-N,N-di-n-propylaminomethylisopropenylbenzene,
3-N,N-di-n-butylaminomethylisopropenylbenzene,
3-N,N-diallylaminomethylisopropenylbenzene,
3-N,N-bis(trimethylsilyl)aminomethylisopropenylbenzene,
3-N,N-bis(tert-butyldimethylsilyl)aminomethylisopropenylbenzene,
3-(1-aziridinyl)methylisopropenylbenzene,
3-(1-pyrrolidinyl)methylisopropenylbenzene,
3-(1-piperidinyl)methylisopropenylbenzene,
3-(1-hexamethyleneimino)methylisopropenylbenzene.

Compounds in which j in the formula (2-Rb) is 2:
3-N,N-dimethylaminoethylisopropenylbenzene,
3-N,N-diethylaminoethylisopropenylbenzene,
3-N,N-di-n-propylaminoethylisopropenylbenzene,
3-N,N-di-n-butylaminoethylisopropenylbenzene,
3-N,N-diallylaminoethylisopropenylbenzene,
3-N,N-bis(trimethylsilyl)aminoethylisopropenylbenzene,
3-N,N-bis(tert-butyldimethylsilyl)aminoethylisopropenylbenzene,
3-(1-aziridinyl)ethylisopropenylbenzene,
3-(1-pyrrolidinyl)ethylisopropenylbenzene, 3-(1-piperidinyl)ethylisopropenylbenzene,
3-(1-hexamethyleneimino)ethylisopropenylbenzene.

Examples of the compound represented by the formula (2) in which $V^2$ is a group represented by the formula (2-V1), $R^{21}$ in the formula (2-V1) is a vinyl group, m is 0, and $A^2$ is a substituted amino group include the following compounds.
2-N,N-dimethylamino-1,3-butadiene,
2-N,N-diethylamino-1,3-butadiene,
2-N,N-di-n-propylamino-1,3-butadiene,
2-N,N-di-n-butylamino-1,3-butadiene,
2-N,N-diallylamino-1,3-butadiene,
2-N,N-bis(trimethylsilyl)amino-1,3-butadiene,
2-N,N-bis(tert-butyldimethylsilyl)amino-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene,
2-(1-pyrazolyl)-1,3-butadiene.

Examples of the compound represented by the formula (2) in which $V^2$ is a group represented by the formula (2-V1), $R^{21}$ in the formula (2-V1) is a vinyl group, m is 1, $R^{22}$ is an alkylene group, and $A^2$ is a substituted amino group include the following compounds.
Compounds in which $R^{22}$ is a methylene group:
2-N,N-dimethylaminomethyl-1,3-butadiene,
2-N,N-diethylaminomethyl-1,3-butadiene,
2-N,N-di-n-propylaminomethyl-1,3-butadiene,
2-N,N-di-n-butylaminomethyl-1,3-butadiene,
2-N,N-diallylaminomethyl-1,3-butadiene,
2-N,N-bis(trimethylsilyl)aminomethyl-1,3-butadiene,
2-N,N-bis(tert-butyldimethylsilyl)aminomethyl-1,3-butadiene,
2-(1-aziridinyl)methyl-1,3-butadiene,
2-(1-pyrrolidinyl)methyl-1,3-butadiene,
2-(1-piperidinyl)methyl-1,3-butadiene,
2-(1-hexamethyleneimino)methyl-1,3-butadiene,
1-(2-methylene-3-butenyl)pyrrole,
1-(2-methylene-3-butenyl)imidazole,
1-(2-methylene-3-butenyl)pyrazole.
Compounds in which $R^{22}$ is an ethylene group:
5-N,N-dimethylamino-3-methylene-1-pentene,
5-N,N-diethylamino-3-methylene-1-pentene,
5-N,N-di-n-propylamino-3-methylene-1-pentene,
5-N,N-di-n-butylamino-3-methylene-1-pentene,
5-N,N-diallylamino-3-methylene-1-pentene,
5-N,N-bis(trimethylsilyl)amino-3-methylene-1-pentene,
5-N,N-bis(tert-butyldimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole,
1-(3-methylene-4-pentenyl)pyrazole.

Examples of the compound represented by the formula (2) in which $V^2$ is a group represented by the formula (2-V1), $R^{21}$ in the formula (2-V1) is a phenyl group, m is 1, $R^{22}$ is a phenylene group, and $A^2$ is a substituted amino group include the following compounds.
1-(4-N,N-dimethylaminophenyl)-1-phenylethylene,
1-(4-N,N-diethylaminophenyl)-1-phenylethylene,
1-(4-N,N-dipropylaminophenyl)-1-phenylethylene,
1-(4-N,N-diisopropyllaminophenyl)-1-phenylethylene,
1-(4-N,N-dibutylaminophenyl)-1-phenylethylene,
1-(4-N,N-diisobutylaminophenyl)-1-phenylethylene,
1-[4-N,N-di(tert-butyl)aminophenyl]-1-phenylethylene,
1-(4-N,N-diphenylaminophenyl)-1-phenylethylene,
1-(4-(1-aziridinyl)phenyl)-1-phenylethylene,
1-[4-(1-pyrrolidinyl)phenyl]-1-phenylethylene,
1-[4-(1-piperidinyl)phenyl]-1-phenylethylene,
1-[4-(1-hexamethyleneimino)phenyl]-1-phenylethylene,
1-(4-morpholinophenyl)-1-phenylethylene,
1-[4-(N,N-bis(trimethylsilyl)amino)phenyl]-1-phenylethylene,
1-[4-(N,N-bis(tert-butyldimethylsilyl)aminophenyl]-1-phenylethylene,
1-[4-(N,N-bis(triisopropylsilyl)amino)phenyl]-1-phenylethylene,
1-(3-N,N-dimethylaminophenyl)-1-phenylethylene,
1-(3-N,N-diethylaminophenyl)-1-phenylethylene,
1-(3-N,N-dipropylaminophenyl)-1-phenylethylene,
1-(3-N,N-diisopropylaminophenyl)-1-phenylethylene,
1-(3-N,N-dibutylaminophenyl)-1-phenylethylene,
1-(3-N,N-diisobutylaminophenyl)-1-phenylethylene,
1-[3-N,N-di(tert-butyl)aminophenyl]-1-phenylethylene,
1-(3-N,N-diphenylaminophenyl)-1-phenylethylene,
1-[3-(1-aziridinyl)phenyl]-1-phenylethylene,
1-[3-(1-pyrrolidinyl)phenyl]-1-phenylethylene,
1-[3-(1-piperidinyl)phenyl]-1-phenylethylene,
1-[3-(1-hexamethyleneimino)phenyl]-1-phenylethylene,
1-(3-morpholinophenyl)-1-phenylethylene,
1-{3-[N,N-bis(trimethylsilyl)amino]phenyl}-1-phenylethylene,
1-{3-[N,N-bis(tert-butyldimethylsilyl)amino]phenyl}-1-phenylethylene,
1-{3-([N,N-bis(triisopropylsilyl)amino]phenyl}-1-phenylethylene.

Examples of the compound represented by the formula (2) in which $V^2$ is a group represented by the formula (2-V1), $R^{21}$ in the formula (2-V1) is a phenyl group, m is 1, $R^{22}$ is a group represented by the formula (2-Ra), and $A^2$ is a substituted amino group include the following compounds.
Compounds in which i in the formula (2-Ra) is 1:
1-(4-N,N-dimethylaminomethylphenyl)-1-phenylethylene,
1-(4-N,N-diethylaminomethylphenyl)-1-phenylethylene,
1-(4-N,N-dipropylaminomethylphenyl)-1-phenylethylene,
1-(4-N,N-diisopropylaminomethylphenyl)-1-phenylethylene,
1-(4-N,N-dibutylaminomethylphenyl)-1-phenylethylene,
1-(4-N,N-diisobutylaminomethylphenyl)-1-phenylethylene,
1-[4-N,N-di(tert-butyl)aminomethylphenyl]-1-phenylethylene,
1-(4-N,N-diphenylaminomethylphenyl)-1-phenylethylene,
1-[4-(1-aziridinylmethyl)phenyl]-1-phenylethylene,
1-[4-(1-pyrrolidinylmethyl)phenyl]-1-phenylethylene,
1-[4-(1-piperidinylmethyl)phenyl]-1-phenylethylene,
1-[4-(1-hexamethyleneiminomethyl)phenyl]-1-phenylethylene,
1-(4-morpholinomethylphenyl)-1-phenylethylene,
1-{4-[N,N-bis(trimethylsilyl)aminomethyl]phenyl}-1-phenylethylene,
1-{4-[N,N-bis(tert-butyldimethylsilyl)aminomethyl]phenyl}-1-phenylethylene,
1-{4-[N,N-bis(triisopropylsilyl)aminomethyl]phenyl}-1-phenylethylene.

Examples of the compound represented by the formula (2) in which $V^2$ is a group represented by the formula (2-V1), $R^{21}$ in the formula (2-V1) is a phenyl group, m is 1, $R^{22}$ is a group represented by the formula (2-Rb), and $A^2$ is a substituted amino group include the following compounds.

Compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene,
1-(3-N,N-diisopropylaminomethylphenyl)-1-phenylethylene,
1-(3-N,N-dibutylaminomethylphenyl)-1-phenylethylene,
1-(3-N,N-diisobutylaminomethylphenyl)-1-phenylethylene,
1-[3-N,N-di(tert-butyl)aminomethylphenyl]-1-phenylethylene,
1-(3-N,N-diphenylaminomethylphenyl)-1-phenylethylene,
1-[3-(1-aziridinylmethyl)phenyl]-1-phenylethylene,
1-[3-(1-pyrrolidinyllmethyl)phenyl]-1-phenylethylene,
1-[3-(1-piperidinylmethyl)phenyl]-1-phenylethylene,
1-(3-hexamethyleneiminomethylphenyl)-1-phenylethylene,
1-(3-morpholinomethylphenyl)-1-phenylethylene,
1-{3-[N,N-bis(trimethylsilyl)aminomethyl]phenyl}-1-phenylethylene,
1-{3-[N,N-bis(tert-butyldimethylsilyl)aminomethyl]phenyl}-1-phenylethylene,
1-{3-[N,N-bis(triisopropylsilyl)aminomethyl]phenyl}-1-phenylethylene.

Examples of the compound represented by the formula (2) in which $V^2$ is a group represented by the formula (2-V1), $R^{21}$ in the formula (2-V1) is a hydrogen atom, m is 0, and $A^2$ is a nitrogen-containing alicyclic heterocyclic group include the following compounds.
1-methyl-3-vinylpyrrolidine,
1-methyl-4-vinylpiperidine,
1-methyl-3-vinylhexamethyleneimine,
1-methyl-4-vinylhexamethyleneimine.

Examples of the compound represented by the formula (2) in which $V^2$ is a group represented by the formula (2-V1), $R^{21}$ in the formula (2-V1) is a hydrogen atom, m is 1, $R^{22}$ is a phenylene group, and $A^2$ is a nitrogen-containing alicyclic heterocyclic group include the following compounds.
Compounds in which i in the formula (2-Ra) is 0:
1-methyl-3-(4-vinylphenyl)pyrrolidine,
1-methyl-4-(4-vinylphenyl)piperidine,
1-methyl-3-(4-vinylphenyl)hexamethyleneimine,
1-methyl-4-(4-vinylphenyl)hexamethyleneimine,
1-methyl-3-(3-vinylphenyl)pyrrolidine,
1-methyl-4-(3-vinylphenyl)piperidine,
1-methyl-3-(3-vinylphenyl)hexamethyleneimine,
1-methyl-4-(3-vinylphenyl)hexamethyleneimine.

Examples of the compound represented by the formula (2) in which $V^2$ is a group represented by the formula (2-V1), $R^{21}$ in the formula (2-V1) is a hydrogen atom, m is 1, $R^{22}$ is a group represented by the formula (2-Ra), and $A^2$ is a nitrogen-containing alicyclic heterocyclic group include the following compounds.
Compounds in which i in the formula (2-Ra) is 1:
1-methyl-3-(4-vinylphenylmethyl)pyrrolidine,
1-methyl-4-(4-vinylphenylmethyl)piperidine,
1-methyl-3-(4-vinylphenylmethyl)hexamethyleneimine,
1-methyl-4-(4-vinylphenylmethyl)hexamethyleneimine.
Compounds in which i in the formula (2-Ra) is 2:
1-methyl-3-(4-vinylphenylethyl)pyrrolidine,
1-methyl-4-(4-vinylphenylethyl)piperidine,
1-methyl-3-(4-vinylphenylethyl)hexamethyleneimine,
1-methyl-4-(4-vinylphenylethyl)hexamethyleneimine.

Examples of the compound represented by the formula (2) in which $V^2$ is a group represented by the formula (2-V1), $R^{21}$ in the formula (2-V1) is a hydrogen atom, m is 1, $R^{22}$ is a group represented by the formula (2-Rb), and $A^2$ is a nitrogen-containing alicyclic heterocyclic group include the following compounds.

Compounds in which j in the formula (2-Rb) is 1:
1-methyl-3-(3-vinylphenylmethyl)pyrrolidine,
1-methyl-4-(3-vinylphenylmethyl)piperidine,
1-methyl-3-(3-vinylphenylmethyl)hexamethyleneimine,
1-methyl-4-(3-vinylphenylmethyl)hexamethyleneimine.
Compounds in which j in the formula (2-Rb) is 2:
1-methyl-3-(3-vinylphenylethyl)pyrrolidine,
1-methyl-4-(3-vinylphenylethyl)piperidine,
1-methyl-3-(3-vinylphenylethyl)hexamethyleneimine,
1-methyl-4-(3-vinylphenylethyl)hexamethyleneimine.

Examples of the compound represented by the formula (2) in which $V^2$ is a group represented by the formula (2-V1), $R^{21}$ in the formula (2-V1) is a methyl group, m is 0, and $A^2$ is a nitrogen-containing alicyclic heterocyclic group include the following compounds.
1-methyl-3-isopropenylimidazole,
1-methyl-4-isopropenylimidazole,
1-methyl-3-isopropenylhexamethyleneimine,
1-methyl-4-isopropenylhexamethyleneimine.

Examples of the compound represented by the formula (2) in which $V^2$ is a group represented by the formula (2-V1), $R^{21}$ in the formula (2-V1) is a methyl group, m is 1, $R^{22}$ is a phenylene group, and $A^2$ is a nitrogen-containing alicyclic heterocyclic group include the following compounds.
1-methyl-3-(4-isopropenylphenyl)pyrrolidine,
1-methyl-4-(4-isopropenylphenyl)piperidine,
1-methyl-3-(4-isopropenylphenyl)hexamethyleneimine,
1-methyl-4-(4-isopropenylphenyl)hexamethyleneimine.

Examples of the compound represented by the formula (2) in which $V^2$ is a group represented by the formula (2-V1), $R^{21}$ in the formula (2-V1) is a methyl group, m is 1, $R^{22}$ is a group represented by the formula (2-Ra) and $A^2$ is a nitrogen-containing alicyclic heterocyclic group include the following compounds.
Compounds in which i in the formula (2-Ra) is 1:
1-methyl-3-(4-isopropenylphenylmethyl)pyrrolidine,
1-methyl-4-(4-isopropenylphenylmethyl)piperidine,
1-methyl-3-(4-isopropenylphenylmethyl)hexamethyleneimine,
1-methyl-4-(4-isopropenylphenylmethyl)hexamethyleneimine.
Compounds in which i in the formula (2a) is 2:
1-methyl-3-(4-isopropenylphenylethyl)pyrrolidine.
1-methyl-4-(4-isopropenylphenylethyl)piperidine,
1-methyl-3-(4-isopropenylphenylethyl)hexamethyleneimine,
1-methyl-4-(4-isopropenylphenylethyl)hexamethyleneimine.

Examples of the compound represented by the formula (2) in which $V^2$ is a group represented by the formula (2-V1), $R^{21}$ in the formula (2-V1) is a vinyl group, m is 0, and $A^2$ is a nitrogen-containing alicyclic heterocyclic group include the following compounds.
1-methyl-3-(1-methylene-2-propenyl)pyrrolidine,
1-methyl-4-(1-methylene-2-propenyl)hexamethyleneimine,
1-methyl-3-(1-methylene-2-propenyl)hexamethyleneimine,
1-methyl-4-(1-methylene-2-propenyl)hexamethyleneimine.

Examples of the compound represented by the formula (2) in which $V^2$ is a group represented by the formula (2-V1), $R^{21}$ in the formula (2-V1) is a vinyl group, m is 1, $R^{22}$ is an alkylene group, and $A^2$ is a nitrogen-containing alicyclic heterocyclic group include the following compounds.
Compounds in which $R^{22}$ is a methylene group:
1-methyl-3-(2-methylene-3-butenyl)pyrrolidine,
1-methyl-4-(2-methylene-3-butenyl)imidazole,
1-methyl-3-(2-methylene-3-butenyl)hexamethyleneimine,
1-methyl-4-(2-methylene-3-butenyl)hexamethyleneimine.

Compounds in which R²² is an ethylene group:
1-methyl-3-(3-methylene-4-pentenyl)pyrrolidine,
1-methyl-4-(3-methylene-4-pentenyl)hexamethyleneimine,
1-methyl-3-(3-methylene-4-pentenyl)hexamethyleneimine,
1-methyl-4-(3-methylene-4-pentenyl)hexamethyleneimine.

Examples of the compound represented by the formula (2) in which V² is a group represented by the formula (2-V1), R²¹ in the formula (2-V1) is a phenyl group, m is 1, R²² is a phenylene group, and A² is a nitrogen-containing alicyclic heterocyclic group include the following compounds.
1-[4-(1-methyl-3-pyrrolidinyl)phenyl]-1-phenylethylene,
1-[4-(1-methyl-3-piperidinyl)phenyl]-1-phenylethylene,
1-[4-(1-methyl-4-piperidinyl)phenyl]-1-phenylethylene,
1-[4-(1-methyl-3-hexamethyleneimino)phenyl]-1-phenylethylene,
1-[4-(1-methyl-4-hexamethyleneimino)phenyl]-1-phenylethylene,
1-[3-(1-methyl-3-pyrrolidinyl)phenyl]-1-phenylethylene,
1-[3-(1-methyl-3-piperidinyl)phenyl]-1-phenylethylene,
1-[3-(1-methyl-4-piperidinyl)phenyl]-1-phenylethylene,
1-[3-(1-methyl-3-hexamethyleneimino)phenyl]-1-phenylethylene,
1-[3-(1-methyl-4-hexamethyleneimino)phenyl]-1-phenylethylene.

Examples of the compound represented by the formula (2) in which V² is a group represented by the formula (2-V1), R²¹ in the formula (2-V1) is a phenyl group, m is 1, R²² is a group represented by the formula (2-Ra), and A² is a nitrogen-containing alicyclic heterocyclic group include the following compounds.
Compounds in which i in the formula (2-Ra) is 1:
1-[(4-(1-methyl-3-pyrrolidinyl)methylphenyl]-1-phenylethylene,
1-[4-(1-methyl-3-piperidinyl)methylphenyl]-1-phenylethylene,
1-[4-(1-methyl-4-piperidinyl)methylphenyl]-1-phenylethylene,
1{4-[(1-methyl-3-hexamethyleneimino)methyl]phenyl}-1-phenylethylene.

Examples of the compound represented by the formula (2) in which V² is a group represented by the formula (2-V1), R²¹ in the formula (2-V1) is a phenyl group, m is 1, R²² is a group represented by the formula (2-Rb), and A² is a nitrogen-containing alicyclic heterocyclic group include the following compounds.
Compounds in which j in the formula (2-Rb) is 1:
1-(3-N,N-dimethylaminomethylphenyl)-1-phenylethylene,
1-(3-N,N-diethylaminomethylphenyl)-1-phenylethylene,
1-(3-N,N-dipropylaminomethylphenyl)-1-phenylethylene,
1-(3-N,N-diisopropylaminomethylphenyl)-1-phenylethylene.

Examples of the compound represented by the formula (2) in which V² is a group represented by the formula (2-V1), R²¹ in the formula (2-V1) is a hydrogen atom, m is 0, and A² is a nitrogen-containing aromatic heterocyclic group include the following compounds.
1-methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline,
4-vinylquinoline.

Examples of the compound represented by the formula (2) in which V² is a group represented by the formula (2-V1), R²¹ in the formula (2-V1) is a methyl group, m is 0, and A² is a nitrogen-containing aromatic heterocyclic group include the following compounds.
1-methyl-2-isopropenylimidazole,
1-methyl-4-isopropenylimidazole,
1-methyl-5-isopropenylimidazole,
2-isopropenylpyridine,
3-isopropenylpyridine,
4-isopropenylpyridine,
2-isopropenylquinoline,
3-isopropenylquinoline,
4-isopropenyquinoline.

Examples of the compound represented by the formula (2) in which V² is a group represented by the formula (2-V1), R²¹ in the formula (2-V1) is a vinyl group, m is 0, and A² is a nitrogen-containing aromatic heterocyclic group include the following compounds.
1-methyl-2-(1-methylene-2-propenyl)imidazole,
1-methyl-4-(1-methylene-2-propenyl)imidazole,
1-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline,
4-(1-methylene-2-propenyl)quinoline.

Examples of the compound represented by the formula (2) in which V² is a group represented by the formula (2-V1), R²¹ in the formula (2-V1) is a vinyl group, m is 1, R²² is an alkylene group, and A² is a nitrogen-containing aromatic heterocyclic group include the following compounds.
Compounds in which R²² is a methylene group:
1-methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline,
4-(2-methylene-3-butenyl)quinoline.
Compounds in which R²² is an ethylene group:
1-methyl-2-(3-methylene-4-pentenyl)imidazole,
1-methyl-4-(3-methylene-4-pentenyl)imidazole,
1-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline,
4-(3-methylene-4-pentenyl)quinoline.

The compound represented by the formula (2) is preferably a compound in which a group represented by V² is represented by the formula (2-V1), and R²¹ in the formula (2-V1) is a hydrogen atom, or a phenyl group.

More preferable is:
a compound in which R²¹ is a hydrogen atom, m is 1, R²² is a phenylene group, and A² is a substituted amino group represented by the formula (2-A);
a compound in which R²¹ is a phenyl group, m is 1, R²² is a phenylene group, and A² is a substituted amino group represented by the formula (2-A);
a compound in which R²¹ is a hydrogen atom, m is 1, R²² is a group represented by the formula (2-R), and A² is a substituted amino group represented by the formula (2-A);

a compound in which $R^{21}$ is a phenyl group, m is 1, $R^{22}$ is a group represented by the formula (2-R), and $A^2$ is a substituted amino group represented by the formula (2-A);
a compound in which $R^{21}$ is a hydrogen atom, m is 0, and $A^2$ is a nitrogen-containing aromatic heterocyclic group.

Further preferable is:
a compound in which $R^{21}$ is a hydrogen atom, m is 1, $R^{22}$ is a para-phenylene group or a meta-phenylene group, and $A^2$ is such that $R^{25}$ and $R^{26}$ in the formula (2-A) are a straight alkyl group having 1 to 2 carbon atoms;
a compound in which $R^{21}$ is a hydrogen atom, m is 1, $R^{22}$ is a para-phenylene group or a meta-phenylene group, and $A^2$ is such that $R^{25}$ and $R^{26}$ in the formula (2-A) are a trimethylsilyl group;
a compound in which $R^{21}$ is a phenyl group, m is 1, $R^{22}$ is a para-phenylene group or a meta-phenylene group, and $A^2$ is such that $R^{25}$ and $R^{26}$ in the formula (2-A) are a straight alkyl group having 1 to 2 carbon atoms;
a compound in which $R^{21}$ is a phenyl group, m is 1, $R^{22}$ is a para-phenylene group or a meta-phenylene group, and $A^2$ is such that $R^{25}$ and $R^{26}$ in the formula (2-A) are a trimethylsilyl group;
a compound in which $R^{21}$ is a hydrogen atom, m is 1, $R^{22}$ is a group represented by the formula (2-Ra) or (2-Rb), and $A^2$ is such that $R^{25}$ and $R^{26}$ in the formula (2-A) are a straight alkyl group having 1 to 2 carbon atoms;
a compound in which $R^{21}$ is a hydrogen atom, m is 1, $R^{22}$ is a group represented by the formula (2-Ra) or (2-Rb), and $A^2$ is such that $R^{25}$ and $R^{26}$ in the formula (2-A) are a trimethylsilyl group;
a compound in which $R^{21}$ is a phenyl group, m is 1, $R^{22}$ is a group represented by the formula (2-Ra) or (2-Rb), and $A^2$ is such that $R^{25}$ and $R^{26}$ in the formula (2-A) are a straight alkyl group having 1 to 2 carbon atoms;
a compound in which $R^{21}$ is a phenyl group, m is 1, $R^{22}$ is a group represented by the formula (2-Ra) or (2-Rb), and $A^2$ is such that $R^{25}$ and $R^{26}$ in the formula (2-A) are a trimethylsilyl group;
a compound in which m is 0, and $A^2$ is a pyridyl group.

The compound represented by the formula (2) is particularly preferably
4-N,N-dimethylaminomethylstyrene,
3-N,N-dimethylaminomethylstyrene,
4-N,N-bis(trimethylsilyl)aminostyrene,
3-N,N-bis(trimethylsilyl)aminostyrene,
1-(4-N,N-dimethylaminophenyl)-1-phenylethylene,
1-(3-N,N-dimethylaminophenyl)-1-phenylethylene,
4-vinylpyridine, or
2-vinylpyridine.

Examples of the compound (G) include a compound represented by the following formula (3).

(3)

wherein E represents an oxygen atom or a sulfur atom, $Z^1$ and $Z^2$ each independently represent a substituted amino group, a hydrogen atom, a hydrocarbyl group optionally having a substituent, or a hydrocarbyloxy group optionally having a substituent, and at least one of $Z^1$ and $Z^2$ is a group having a substituted amino group, or $Z^1$ and $Z^2$ are bonded to represent a group in which a ring structure having a substituted amino group is formed by $Z^1$, $Z^2$ and carbonyl carbon.

In the formula (3), E represents an oxygen atom or a sulfur atom. Preferable is an oxygen atom.

In the formula (3), examples of the substituted amino group of $Z^1$ and $Z^2$ include an amino group having a hydrocarbyl group as a substituent, an amino group having a group having a substituted amino group as a substituent, and an amino group having a group having a hydrocarbyloxy group as a substituent.

Examples of the amino group having a hydrocarbyl group as a substituent include a dialkylamino group such as a dimethylamino group, a diethylamino group, and a dipropylamino group.

Examples of the amino group having a group having a substituted amino group as a substituent include a (dialkylaminoalkyl)amino group such as a (dimethylaminomethyl)amino group, a (dimethylaminoethyl)amino group, a (dimethylaminopropyl)amino group, a (diethylaminopropyl)amino group, and a (dipropylaminopropyl)amino group; a bis(dialkylaminoalkyl)amino group such as a bis(dimethylaminoethyl)amino group, and a bis(dimethylaminopropyl)amino group.

Examples of the amino group having a group having a hydrocarbyloxy group as a substituent include an (alkoxyalkyl)amino group such as a (methoxymethyl)amino group, a (methoxyethyl)amino group, a (methoxypropyl)amino group, and an (ethoxymethyl)amino group; an (aryloxyalkyl)amino group such as a (phenoxymethyl)amino group, and a (phenoxyethyl)amino group; an (aralkyloxyalkyl)amino group such as a (benzyloxymethyl)amino group, and a (benzyloxyethyl)amino group.

Examples of the hydrocarbyl group optionally having a substituent of $Z^1$ and $Z^2$ include a hydrocarbyl group, a hydrocarbyl group having a substituted amino group as a substituent, and a hydrocarbyl group having a hydrocarbyloxy group as a substituent.

Examples of the hydrocarbyl group include an alkyl group such as a methyl group, an ethyl group, a n-propyl group, an isopropyl group, and a n-butyl group; a cycloalkyl group such as a cyclohexyl group; an aryl group such as a phenyl group, a methylphenyl group, and an ethylphenyl group; an aralkyl group such as benzyl group; an alkenyl group such as a vinyl group, a 1-propenyl group, an allyl group, an isopropenyl group, a crotyl group, an isocrotyl group, and a methallyl group; an alkynyl group such as a propargyl group.

Examples of the hydrocarbyl group having a substituted amino group as a substituent include a hydrocarbyl group having a hydrocarbyl-substituted amino group as a substituent. Examples of the hydrocarbyl group having a hydrocarbyl-substituted amino group as a substituent include a dialkylaminoalkyl group such as a dimethylaminomethyl group, a dimethylaminoethyl group, and a dimethylaminopropyl group; a dialkylaminoaryl group such as a dimethylaminophenyl group, and a diethylaminophenyl group.

Examples of the hydrocarbyl group having a hydrocarbyloxy group as a substituent include an alkoxyalkyl group such as a methoxymethyl group, a methoxyethyl group, a methoxypropyl group, and an ethoxymethyl group; an aryloxyalkyl group such as a phenoxymethyl group, and a phenoxyethyl group; an aralkyloxyalkyl group such as a benzyloxymethyl group, and a benzyloxyethyl group.

Examples of the hydrocarbyloxy group optionally having a substituent include a hydrocarbyloxy group, a hydrocarbyloxy group having a hydrocarbyloxy group as a substituent, and a hydrocarbyloxy group having a substituted amino group as a substituent.

Examples of the hydrocarbyloxy group include an alkoxy group such as a methoxy group, an ethoxy group, a n-propoxy group, an isopropoxy group, and a butoxy group; an aryloxy group such as a phenoxy group, a methylphenoxy group, and an ethylphenoxy group; an aralkyloxy group such as a benzyloxy group.

Examples of the hydrocarbyloxy group having a hydrocarbyloxy group as a substituent include an alkoxyalkoxy group such as a methoxymethoxy group, a methoxyethoxy group, a methoxypropoxy group, and an ethoxymethoxy group; an aryloxyalkoxy group such as a phenoxymethoxy group, and a phenoxyethoxy group; an aralkyloxyalkoxy group such as a benzyloxymethoxy group, and a benzyloxyethoxy group.

Examples of the hydrocarbyloxy group having a substituted amino group as a substituent include a hydrocarbyloxy group having a hydrocarbyl-substituted amino group as a substituent. Examples of the hydrocarbyloxy group having a hydrocarbyl-substituted amino group as a substituent include a dialkylaminoalkoxy group such as a dimethylaminomethoxy group, a dimethylaminoethoxy group, and a dimethylaminopropoxy group.

Examples of the group having a substituted amino group include preferably a group represented by the following formula (3-Z).

    (3-Z)

wherein p is 0 or 1, T represents a hydrocarbylene group having 1 to 10 carbon atoms, a group represented by the following formula (3-Ta), or a group represented by the following formula (3-Tb), and $A^3$ represents a substituted amino group.

    (3-Ta)

wherein $R^{31}$ represents a hydrocarbylene group having 1 to 10 carbon atoms, and $R^{31}$ bonds to $A^3$.

    (3-Tb)

wherein $R^{32}$ represents a hydrocarbylene group having 1 to 10 carbon atoms, $R^{33}$ represents a hydrogen atom or a hydrocarbyl group having 1 to 10 carbon atoms, and $R^{32}$ bonds to $A^3$.

When $Z^1$ in the formula (3) is a group represented by the formula (3-Z), and $Z^2$ is a hydrocarbyl group, $A^3$ of $Z^1$ and a hydrocarbylene group of $Z^2$ may be bonded. In addition, when $Z^1$ and $Z^2$ in the formula (3) are a group represented by the formula (3-Z), $A^3$ of $Z^1$ and $A^3$ of $Z^2$ may be bonded.

In the formula (3-Z), p represents 0 or 1.

In the formula (3-Z), T represents a hydrocarbylene group having 1 to 10 carbon atoms, a group represented by the formula (3-Ta), or a group represented by the formula (3-Tb).

Examples of the hydrocarbylene group having 1 to 10 carbon atoms of T include an alkylene group such as a methylene group, an ethylene group, a trimethylene group, a tetramethylene group, a pentamethylene group, and a hexamethylene group; an arylene group such as a phenylene group, and a naphthylene group.

In the formula (3-Ta), $R^{31}$ represents a hydrocarbylene group having 1 to 10 carbon atoms and, in the formula (3-Tb), $R^{32}$ represents a hydrocarbylene group having 1 to 10 carbon atoms, and $R^{33}$ represents a hydrogen atom or a hydrocarbyl group having 1 to 10 carbon atoms.

Examples of the hydrocarbylene group having 1 to 10 carbon atoms of $R^{31}$ and $R^{32}$ include an alkylene group such as a methylene group, an ethylene group, a trimethylene group, a tetramethylene group, a pentamethylene group, and a hexamethylene group; an arylene group such as a phenylene group, and a naphthylene group. Preferable is an ethylene group, or a trimethylene group.

Examples of the hydrocarbyl group having 1 to 10 carbon atoms of $R^{33}$ include an alkyl group, an aralkyl group, and an aryl group. Examples of the alkyl group include a methyl group, an ethyl group, a n-propyl group, an isopropyl group, a n-butyl group, a sec-butyl group, and a tert-butyl group. Examples of the aralkyl group include a benzyl group. Examples of the aryl group include a phenyl group. Preferable is an alkyl group having 1 to 10 carbon atoms, and more preferable is a methyl group or an ethyl group. $R^{33}$ is preferably a hydrogen atom, or an alkyl group having 1 to 10 carbon atoms, more preferably a hydrogen atom, a methyl group or an ethyl group.

Examples of the group represented by the formula (3-Ta) include a group represented by —O—CH$_2$CH$_2$—, and a group represented by —O—CH$_2$CH$_2$CH$_2$—.

Examples of the group represented by the formula (3-Tb) include a group represented by —NH—CH$_2$CH$_2$—, and a group represented by —NH—CH$_2$CH$_2$CH$_2$—.

Examples of the group represented by $A^3$ in the formula (3-Z) include preferably a group represented by the following formula (3-A).

    (3-A)

wherein $R^{34}$ and $R^{35}$ each independently represent a hydrocarbyl group optionally having a nitrogen atom and/or an oxygen atom, or a trihydrocarbylsilyl group, or $R^{34}$ and $R^{35}$ are bonded to represent a hydrocarbylene group optionally having a nitrogen atom and/or an oxygen atom as a hetero atom, or $R^{34}$ and $R^{35}$ are one group, and represent a group which bonds to a nitrogen atom with a double bond.

Examples of the hydrocarbyl group of $R^{34}$ and $R^{35}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and a 1-methylethenyl group. Examples of the alkynyl group include an ethynyl group, and a propargyl group. Examples of the aryl group include a phenyl group, a tolyl group, and a xylyl group. Examples of the aralkyl group include a benzyl group.

The hydrocarbyl group of $R^{34}$ and $R^{35}$ has preferably 1 to 10, more preferably 1 to 4, further preferably 1 to 2 carbon atoms.

The hydrocarbyl group of $R^{34}$ and $R^{35}$ is preferably an alkyl group, or an alkenyl group, more preferably an alkyl group, further preferably a linear alkyl group.

Examples of the hydrocarbyl group having a nitrogen atom of $R^{34}$ and $R^{35}$ include a dialkylaminoalkyl group such as a dimethylaminomethyl group, a dimethylaminoethyl group, a dimethylaminopropyl group, and a diethylaminoethyl group. The hydrocarbyl group having a nitrogen atom of $R^{35}$ has preferably 3 to 10, more preferably 3 to 6, further preferably 3 to 4 carbon atoms.

Examples of the hydrocarbyl group having an oxygen atom of $R^{34}$ and $R^{35}$ include an alkoxyalkyl group such as a methoxymethyl group, a methoxyethyl group, a methoxypropyl group, an ethoxymethyl group, and an ethoxyethyl group; an oxacycloalkyl group such as an oxiranyl group, and a tetrahydrofuranyl group; an oxacycloalkylalkyl group such as a glycidyl group, and a tetrahydrofurfuryl group. The hydrocarbyl group having an oxygen atom of $R^{35}$ has preferably 2 to 10, more preferably 2 to 6, further preferably 2 to 4 carbon atoms.

Herein, the oxacycloalkyl group represents a group in which $CH_2$ on an alicyclic ring of a cycloalkyl group is substituted with an oxygen atom, and the oxacycloalkylalkyl group represents a group in which a hydrogen atom of an alkyl group is substituted with an oxacycloalkyl group.

Examples of the trihydrocarbylsilyl group of $R^{34}$ and $R^{35}$ include trialkylsilyl groups such as a trimethylsilyl group, a triethylsilyl group, a triisopropylsilyl group, and a tert-butyldimethylsilyl group.

The trihydrocarbylsilyl group of $R^{34}$ and $R^{35}$ is preferably a trialkylsilyl group having 3 to 9 carbon atoms, more preferably a trialkylsilyl group in which an alkyl group bonded to a silicon atom is an alkyl group having 1 to 4 carbon atoms, further preferably a trimethylsilyl group.

Examples of the hydrocarbylene group optionally having a nitrogen atom and/or an oxygen atom as a hetero atom in which $R^{34}$ and $R^{35}$ are bonded include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2CH_2$—O—$CH_2CH_2$—.

The group in which $R^{34}$ and $R^{35}$ are bonded has preferably 2 to 20, more preferably 2 to 7, further preferably 4 to 6 carbon atoms.

The hydrocarbylene group optionally having a nitrogen atom and/or an oxygen atom as a hetero atom in which $R^{34}$ and $R^{35}$ are bonded is preferably a hydrocarbylene group, more preferably an alkylene group, further preferably a polymethylene group.

Examples of one group in which $R^{34}$ and $R^{35}$ bond to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The one group in which $R^{34}$ and $R^{35}$ bond to a nitrogen atom with a double bond has preferably 2 to 20, more preferably 2 to 6 carbon atoms.

$R^{34}$ and $R^{35}$ are preferably a hydrocarbyl group, a trihydrocarbylsilyl group, or a hydrocarbylene group in which $R^{34}$ and $R^{35}$ are bonded.

Examples of the group represented by the formula (3-X) include a non-cyclic amino group, and a cyclic amino group.

Examples of the non-cyclic amino group include a dialkylamino group, and a bis(trialkylsilyl)amino group. Examples of the dialkylamino group include a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Examples of the bis(trialkylsilyl)amino group include a bis(trimethylsilyl)amino group, and a bis(tert-butyldimethylsilyl)amino group.

Examples of the non-cyclic amino group include an ethylideneamino group, a 1-methylpropylideneamino group, a 1,3-dimethylbutylideneamino group, a 1-methylethylideneamino group and a 4-N,N-dimethylaminobenzylideneamino group.

Examples of the cyclic amino group include a 1-aziridinyl group, a 1-azetidinyl group, a 1-pyrrolidinyl group, a 1-piperidinyl group, a 1-hexamethyleneimino group, a 1-imidazolyl group, a 4,5-dihydro-1-imidazolyl group, a 1-pyrrolyl group, a 1-pyrazolyl group, a 1-imidazolidinyl group, a 1-piperazinyl group, and a morpholino group.

The group represented by the formula (3-A) is preferably a group in which $R^{34}$ and $R^{35}$ are a hydrocarbyl group, a group in which $R^{34}$ and $R^{35}$ are a trihydrocarbylsilyl group, a group in which $R^{34}$ and $R^{35}$ are an oxacycloalkylalkyl group, or a group in which $R^{34}$ and $R^{35}$ are bonded to form a hydrocarbylene group. More preferable is a group in which $R^{34}$ and $R^{35}$ are a straight alkyl group, a group in which $R^{34}$ and $R^{35}$ are a trialkylsilyl group, or a group in which $R^{34}$ and $R^{35}$ are bonded to form a polymethylene group.

The group represented by the formula (3-A) is preferably a dialkylamino group.

Examples of the group represented by the formula (3-Z) in which p=0 include a dihydrocarbylamino group such as a dimethylamino group, and a diethylamino group; a cyclic amino group such as a 1-aziridinyl group, a 1-pyrrolidinyl group, a 1-piperidinyl group, a 1-hexamethyleneimino group, a 1-imidazolyl group, a 4,5-dihydro-1-imidazolyl group, a 1-imidazolidinyl group, a 1-piperazinyl group, and a morpholino group; a di(oxacycloalkylalkyl)amino group such as a di(glycidyl)amino group and a di(tetrahydrofurfuryl)amino group; a bis(trialkylsilyl)amino group such as a bis(trimethylsilyl)amino group, a bis(triethylsilyl)amino group, a bis(t-butyldimethylsilyl)amino group, and a bis(triisopropylsilyl) amino group.

Examples of the group represented by the formula (3-Z) in which p=1, and T is a hydrocarbylene group include a dihydrocarbylaminoalkyl group such as a dimethylaminoethyl group, a diethylaminoethyl group, a dimethylaminopropyl group, and a diethylaminopropyl group; a dihydrocarbylaminoaryl group such as a dimethylaminophenyl group, and a diethylaminophenyl group.

Examples of the group represented by the formula (3-Z) in which p=1, and T is a group represented by the formula (3-Ta) include a group represented by —O—$CH_2CH_2$—$N(CH_3)_2$, a group represented by —O—$CH_2CH_2$—$N(CH_2CH_3)_2$, a group represented by —O—$CH_2CH_2CH_2$—$N(CH_3)_2$, and a group represented by —O—$CH_2CH_2CH_2$—$N(CH_2CH_3)_2$.

Examples of the group represented by the formula (3-Z) in which p=1, and T is a group represented by the formula (3-Tb) include a group represented by —NH—$CH_2CH_2$—$N(CH_3)_2$, a group represented by —NH—$CH_2CH_2$—$N(CH_2CH_3)_2$, a group represented by —NH—$CH_2CH_2CH_2$—$N(CH_3)_2$, and a group represented by —NH—$CH_2CH_2CH_2$—$N(CH_2CH_3)_2$.

Examples of the compound represented by the formula (3) include a carboxylic acid amide compound, a thiocarboxylic acid amide compound, a carboxylic acid ester compound, and a thiocarboxylic acid ester compound.

Examples of the carboxylic acid amide compound include:
a formamide compound such as N,N-dimethylformamide, and N,N-diethylformamide;
an acetamide compound such as N,N-dimethylacetamide, N,N-diethylacetamide, aminoacetamide, N,N-dimethyl-N', N'-dimethylaminoacetamide, N,N-dimethylaminoacetamide, N,N-dimethyl-N'-ethylaminoacetamide, N,N-dimethylaminoacetamide, and N-phenyldiacetamide;
a propionamide compound such as N,N-dimethylpropionamide;

a benzamide compound such as N,N-dimethylbenzamide, N',N'-(p-dimethylamino)benzamide, N,N'-(p-diethylamino)benzamide, N,N-dimethyl-N',N'-(p-dimethylamino)benzamide, and N,N-dimethyl-N',N'-p-diethylamino)benzamide;

a pyridylamide compound such as N,N-dimethyl-4-pyridylamide;

a phthalamide compound such as N,N,N',N'-tetramethylphthalamide, and N,N,N',N'-tetraethylphthalamide.

Examples of the thiocarboxylic acid amide compound include:

a thioformamide compound such as N,N-dimethylthioformamide, and N,N-diethylthioformamide;

a thioacetamide compound such as N,N-dimethylthioacetamide, N,N-diethylthioacetamide, aminothioacetamide, N,N-dimethyl-N'-N'-dimethylaminothioacetamide, N,N-dimethylaminothioacetamide, N,N-dimethyl-N'-ethylaminothioacetamide, N,N-dimethylaminothioacetamide, and N-phenyldithioacetamide;

a thiopropionamide compound such as N,N-dimethylthiopropionamide;

a thiobenzamide compound such as N,N-dimethylthiobenzamide, N',N'-(p-dimethylamino)thiobenzamide, N',N'-(p-diethylamino)thiobenzamide, N,N-dimethyl-N',N'-(p-dimethylaminothiobenzamide, and N,N-dimethyl-N',N'-(p-diethylamino)thiobenzamide;

a pyridylthioamide compound such as N,N-dimethyl-4-pyridylthioamide;

a thiophthalamide compound such as N,N,N',N'-tetramethylthiophthalamide, and N,N,N',N'-tetraethylthiophthalamide.

Examples of the carboxylic acid ester compound include:
N,N-dialkylaminomethyl acetate such as N,N-dimethylaminomethyl acetate, and N,N-diethylaminomethyl acetate;
N,N-dialkylaminoethyl acetate such as N,N-dimethylaminoethyl acetate, and N,N-diethylaminoethyl acetate;
N,N-dialkylaminopropyl acetate such as N,N-dimethylaminopropyl acetate, and N,N-diethylaminopropyl acetate;
N,N-dialkylaminoethyl benzoate such as N,N-dimethylaminoethyl benzoate, and N,N-diethylaminoethyl benzoate.

Examples of the thiocarboxylic acid ester compound include:
N,N-dialkylaminomethyl thioacetate such as N,N-dimethylaminomethyl thioacetate, and N,N-diethylaminomethyl thioacetate;
N,N-dialkylaminoethyl thioacetate such as N,N-dimethylaminoethyl thioacetate, and N,N-diethylaminoethyl thioacetate;
N,N-dialkylaminopropyl thioacetate such as N,N-dimethylaminopropyl thioacetate, and N,N-diethylaminopropyl thioacetate;
N,N-dialkylaminoethyl thiobenzoate such as N,N-dimethylaminoethyl thiobenzoate, and N,N-diethylaminoethyl thiobenzoate.

Examples of a preferable compound represented by the formula (3) include a compound in which $Z^1$ is a group represented by the formula (3-Z), and $Z^2$ is a hydrocarbyl group optionally having a substituent, or a hydrogen atom.

Examples of the compound include a compound represented by the following formula (3-1) in which p in the formula (3-Z) is 1, and T is a phenylene group, and a compound represented by the following formula (3-2).

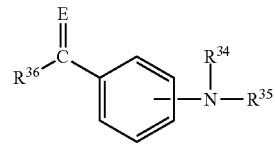

(3-1)

wherein E represents an oxygen atom, or a sulfur atom, $R^{34}R^{35}N$— is a substituent on a benzene ring, $R^{34}$ and $R^{35}$ each represent a hydrocarbyl group optionally having a nitrogen atom and/or an oxygen atom, or a trihydrocarbylsilyl group, or $R^{34}$ and $R^{35}$ are bonded to represent a hydrocarbylene group optionally having a nitrogen atom and/or an oxygen atom as a hetero atom, or $R^{34}$ and $R^{35}$ are one group, and represent a group which bonds to a nitrogen atom with a double bond, and $R^{36}$ represents a hydrocarbyl group, or a hydrogen atom.

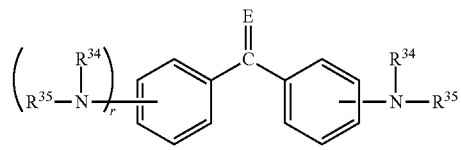

(3-2)

wherein E represents an oxygen atom, or a sulfur atom, r represents an integer of 0 to 2, $R^{34}R^{35}N$— is a substituent on a benzene ring, $R^{34}$ and $R^{35}$ each independently represent a hydrocarbyl group optionally having a nitrogen atom and/or an oxygen atom, or a trihydrocarbylsilyl group, or $R^{34}$ and $R^{35}$ are bonded to represent a hydrocarbylene group optionally having a nitrogen atom and/or an oxygen atom as a hetero atom, or $R^{34}$ and $R^{35}$ are one group, and represent a group which bonds to a nitrogen atom with a double bond.)

E in the formula (3-1) and the formula (3-2) represents an oxygen atom or a sulfur atom, and is preferably an oxygen atom.

Here, r in the formula (3-2) represents the number of 0 to 2.

$R^{34}R^{35}N$— in the formula (3-1) and the formula (3-2) is a substituent on a benzene ring. Definition, exemplification and a preferable group of $R^{34}$ and $R^{35}$ are the same as definition, exemplification and a preferable group described in $R^{34}$ and $R^{35}$ in the formula (3-A).

$R^{34}R^{35}N$— in the formula (3-1) and the formula (3-2) is preferably a dialkylamino group. An alkyl group of the dialkylamino group is preferably an alkyl group having 1 to 4 carbon atoms.

$R^{36}$ in the formula (3-1) represents a hydrogen atom or a hydrocarbyl group. Examples of the hydrocarbyl group include an alkyl group such as a methyl group, an ethyl group, a n-propyl group, an isopropyl group, a n-butyl group, a sec-butyl group, and a tert-butyl group; an aryl group such as a phenyl group, a methylphenyl group, and an ethylphenyl group; an aralkyl group such as a benzyl group.

Examples of the compound represented by the formula (3-1) include
a dialkylamino-substituted benzaldehyde compound such as 4-dimethylaminobenzaldehyde, and 4-diethylaminobenzaldehyde;
a dialkylamino-substituted acetophenone compound such as 4-dimethylaminoacetophenone, and 4-diethylaminoacetophenone;

a hetero ring group-substituted acetophenone compound such as 4'-imidazol-1-yl-acetophenone, 4'-(1-pyrazolyl)acetophenone, and 4-morpholinoacetophenone;
a dialkylamino-substituted thiobenzaldehyde compound such as 4-dimethylaminothiobenzaldehyde, and 4-diethylaminothiobenzaldehyde;
a dialkylamino-substituted thioacetophenone compound such as 4-dimethylaminothioacetophenone, and 4-diethylaminothioacetophenone;
a hetero ring group-substituted thioacetophenone compound such as 4'-imidazol-1-yl-thioacetophenone, 4'-(1-pyrazolyl) thioacetophenone, and 4-morpholinothioacetophenone.

Examples of the compound represented by the formula (3-2) include:
a dialkylamino-substituted benzophenone compound such as 3-dimethylaminobenzophenone, 3-diethylaminobenzophenone, 4-dimethylaminobenzophenone, 4-diethylaminobenzophenone, 4,4'-bis(dimethylamino)-benzophenone, and 4,4'-bis(diethylamino)-benzophenone;
a hetero ring group-substituted benzophenone compound such as 4'-(imidazol-1-yl)-benzophenone, 4'(1-pyrazolylkenzophenone, and 4-morpholinobenzophenone;
a dialkylamino-substituted thiobenzophenone compound such as 3-dimethylaminothiobenzophenone, 3-diethylaminothiobenzophenone, 4-dimethylaminothiobenzophenone, 4-diethylaminothiobenzophenone, 4,4'-bis(dimethylamino)-thiobenzophenone, and 4,4'-bis(diethylamino)-thiobenzophenone;
a hetero ring group-substituted thiobenzophenone compound such as 4'-(imidazol-1-yl)-thiobenzophenone, 4'-(1-pyrazolyl)thiobenzophenone, and 4-morpholinothiobenzophenone.

Examples of a preferable compound represented by the formula (3) include a compound represented by the following formula (3-3) in which E is an oxygen atom, $Z^1$ is a group represented by the formula (3-Z), and $Z^2$ is a hydrocarbyl group.

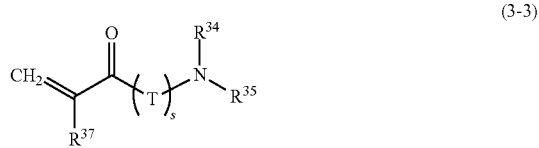

(3-3)

wherein s is an integer of 0 or 1, T represents a hydrocarbylene group having 1 to 10 carbon atoms, a group represented by the formula (3-Ta), or a group represented by the formula (3-Tb), $R^{34}$ and $R^{35}$ each represent a hydrocarbyl group optionally having a nitrogen atom and/or an oxygen atom, or a trihydrocarbylsilyl group, or $R^{34}$ and $R^{35}$ are bonded to represent a hydrocarbylene group optionally having a nitrogen atom and/or an oxygen atom as a hetero atom, or $R^{34}$ and $R^{35}$ are one group, and represent a group which bonds to a nitrogen atom with a double bond, and $R^{37}$ represents a hydrogen atom, or a hydrocarbyl group.

Definition, exemplification and a preferable group of T in the formula (3-3) are the same as definition, exemplification and a preferable group described in the formula (3-Z).

Definition, exemplification and a preferable group of $R^{34}$ and $R^{35}$ in the formula (3-3) are the same as definition, exemplification and a preferable group described in the formula (3-A).

Examples of the hydrocarbyl group of $R^{37}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, preferably a methyl group. Examples of the alkenyl group include a vinyl group, an allyl group, a 1-propenyl group, and a 1-methylethenyl group, preferably a vinyl group. Examples of the aryl group include a phenyl group, a methylphenyl group, and an ethylphenyl group, preferably a phenyl group.

$R^{37}$ is preferably a hydrogen atom, a methyl group, a vinyl group, or a phenyl group, more preferably a hydrogen atom, or a methyl group.

Examples of the compound represented by the formula (3-3) include the following acrylamide compounds in which s is 0, and $R^{37}$ is a hydrogen atom.
N,N-dimethylacrylamide,
N,N-diethylacrylamide,
N,N-bistrimethylsilylacrylamide,
N,N-di(glycidyl)acrylamide,
N,N-di(tetrahydrofurfuryl)acrylamide, morpholinoacrylamide.

Examples of the compound represented by the formula (3-3) include the following acrylamide compounds in which s is 1, T is a group represented by the formula (3-Tb), and $R^{37}$ is a hydrogen atom.
N-(2-dimethylaminoethyl)acrylamide,
N-(3-dimethylaminopropyl)acrylamide,
N-(4-dimethylaminobutyl)acrylamide,
N-(2-diethylaminoethyl)acrylamide,
N-(3-diethylaminopropyl)acrylamide,
N-(4-diethylaminobutyl)acrylamide,
N-(3-bistrimethylsilylaminopropyl)acrylamide,
N-(3-di(glycidyl)aminopropyl)acrylamide,
N-(3-di(tetrahydrofurfuryl)aminopropyl)acrylamide,
N-(3-morpholinopropyl)acrylamide.

Examples of the compound represented by the formula (3-3) include the following methacrylamide compounds in which s is 0, and $R^{37}$ is a methyl group.
N,N-dimethylmethacrylamide,
N,N-diethylmethacrylamide,
N,N-bistrimethylsilylmethacrylamide,
N,N-di(glycidyl)methacrylamide,
N,N-di(tetrahydrofurfuryl)methacrylamide, morpholinomethacrylamide.

In addition, examples of the compound represented by the formula (3-3) include the following methacrylamide compounds in which s is 1, T is a group represented by the formula (3-Tb), and $R^{37}$ is a methyl group.
N-(2-dimethylaminoethyl)methacrylamide,
N-(3-dimethylaminopropyl)methacrylamide,
N-(4-dimethylaminobutyl)methacrylamide,
N-(2-diethylaminoethyl)methacrylamide,
N-(3-diethylaminopropyl)methacrylamide,
N-(4-diethylaminobutyl)methacrylamide,
N-(3-bistrimethylsilylaminopropyl)methacrylamide,
N-(3-di(glycidyl)aminopropyl)methacrylamide,
N-(3-di(tetrahydrofurfuryl)aminopropyl)methacrylamide,
N-(3-morpholinopropyl)methacrylamide.

Examples of the compound represented by the formula (3-3) include the following acrylate compounds in which s is 1, T is a group represented by the formula (3-Ta), and $R^{37}$ is a hydrogen atom.
2-dimethylaminoethyl acrylate,
3-dimethylaminopropyl acrylate,
4-dimethylaminobutyl acrylate,
2-diethylaminoethyl acrylate,
3-diethylaminopropyl acrylate,
4-diethylaminobutyl acrylate, 3-bistrimethylsilylaminopropyl acrylate,
3-di(glycidyl)aminopropyl acrylate,
3-di(tetrahydrofurfuryl)aminopropyl acrylate,
3-morpholinopropyl acrylate.

Examples of the compound represented by the formula (3-3) include the following methacrylate compounds in which s is 1, T is a group represented by the formula (3-Ta), and $R^{37}$ is a methyl group.
2-dimethylaminoethyl methacrylate,
3-dimethylaminopropyl methacrylate,
4-dimethylaminobutyl methacrylate,
2-diethylaminoethyl methacrylate,
3-diethylaminopropyl methacrylate,
4-diethylaminobutyl methacrylate,
3-bistrimethylsilylaminopropyl methacrylate,
3-di(glycidyl)aminopropyl methacrylate,
3-di(tetrahydrofurfuryl)aminopropyl methacrylate,
3-morpholinopropyl methacrylate.

The compound represented by the formula (3) is preferably a compound represented by the formula (3-3), more preferably an acrylamide compound, or a methacrylamide compound, in which s is 1, T is the formula (3-Tb), and $R^{37}$ is a hydrogen atom or a methyl group.

Further preferable is:
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

Examples of a preferable compound represented by the formula (3) include a compound in which $Z^1$ is a group represented by the formula (3-Z), $Z^2$ is a hydrocarbylene group, and $A^3$ of $Z^1$ and a hydrocarbylene group of $Z^2$ are bonded, and a compound in which $Z^1$ and $Z^2$ are a group represented by the formula (3-Z), and $A^3$ of $Z^1$ and $A^3$ of $Z^2$ are bonded. Examples of the compound include a compound represented by the following formula (3-4) in which E is an oxygen atom, and p is 0, and a compound represented by the following formula (3-5).

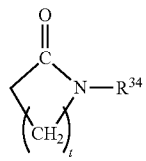

(3-4)

wherein t represents an integer of 0 to 10, and $R^{34}$ represents a hydrocarbyl group optionally having a nitrogen atom and/or an oxygen atom, or a trihydrocarbylsilyl group.

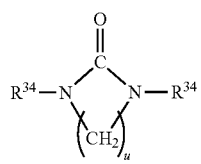

(3-5)

wherein u represents an integer of 0 to 10, and $R^{34}$ represents a hydrocarbyl group optionally having a nitrogen atom and/or an oxygen atom, or a trihydrocarbylsilyl group.

In the formulae, t and u represent an integer of 0 to 10, respectively. From a view point of enhancement of fuel cost-saving properties, t and u are preferably 2 or more and, and from a view point of enhancement of economic efficiency at production, t and u are preferably 7 or less.

In the formulae, definition, exemplification and a preferable group of $R^{34}$ are the same as definition, and exemplification described in $R^{34}$ in the formula (3-A).

$R^{34}$ is preferably a hydrocarbyl group, more preferably an alkyl group having 1 to 4 carbon atoms, and an aryl group having 6 to 10 carbon atoms.

Examples of the compound represented by the formula (3-4) include:

a β-propiolactam compound such as N-methyl-β-propiolactam, N-(t-butyl)-β-propiolactam, and N-phenyl-β-propiolactam;

a 2-pyrrolidone compound such as 1-methyl-2-pyrrolidone, 1-(t-butyl)-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(t-butyl)-5-methyl-2-pyrrolidone, and 1-(t-butyl)-1,3-dimethyl-2-pyrrolidone:

a 2-piperidone compound such as 1-(t-butyl)-2-piperidone, 1-phenyl-2-piperidone, 1-(p-methylphenyl)-2-piperidone, 1-(p-methoxyphenyl)-2-piperidone, and 1-naphthyl-2-piperidone:

a ε-caprolactam compound such as N-methyl-ε-caprolactam, N-ethyl-ε-caprolactam, N-(n-propyl)-ε-caprolactam, N-phenyl-ε-caprolactam, N-(p-methoxyphenyl)-ε-caprolactam, and N-benzyl-ε-caprolactam;

an ω-laurilolactam compound such as N-phenyl-ω-laurilolactam.

The compound represented by the formula (3-4) is preferably a 2-pyrrolidone compound, or a ε-caprolactam compound, more preferably 1-hydrocarbyl-substituted-2-pyrrolidone, N-hydrocarbyl-substituted-ε-caprolactam, further preferably 1-alkyl-substituted-2-pyrrolidone, 1-aryl-substituted-2-pyrrolidone, N-alkyl-substituted-ε-caprolactam, or N-aryl-substituted-ε-caprolactam, particularly preferably 1-phenyl-2-pyrrolidone, or N-methyl-ε-caprolactam.

Examples of the compound represented by the formula (3-5) include 1,3-hydrocarbyl-substituted-2-imidazolidinone such as 1,3-dimethyl-2-imidazolidinone, 1,3-diethyl-2-imidazolidinone, 1,3-di(n-propyl)-2-imidazolidinone, 1,3-di(t-butyl)-2-imidazolidinone, and 1,3-diphenyl-2-imidazolidinone.

The compound represented by the formula (3-5) is preferably 1,3-substituted-2-imidazolidinone, more preferably 1,3-hydrocarbyl-substituted-2-imidazolidinone, further preferably 1,3-dialkyl-2-imidazolidinone. 1,3-Dialkyl-2-imidazolidinone is preferably 1,3-dimethyl-2-imidazolidinone, 1,3-diethyl-2-imidazolidinone, or 1,3-di(n-propyl)-2-imidazolidinone, more preferably 1,3-dimethyl-2-imidazolidinone.

The content of the monomer unit based on a compound represented by the formula (1) is preferably 0.01% by weight or more, more preferably 0.02% by weight or more, further preferably 0.05% by weight or more per 100% by weight of the conjugated diene-based polymer, in order to enhance fuel cost-saving properties. In order to enhance economic efficiency, and increase a tensile strength at break, the content is preferably 20% by weight or less, more preferably 2% by weight or less, further preferably 1% by weight or less.

In addition, in the monomer unit based on a compound represented by the formula (1), groups represented by $X^1$, $X^2$ and $X^3$ may have been converted into hydroxyl groups by hydrolysis, etc.

The content of the monomer unit based on a compound represented by the formula (2) is preferably 0.01% by weight or more, more preferably 0.02% by weight or more, further preferably 0.05% by weight or more per 100% by weight of the conjugated diene-based polymer, in order to enhance fuel cost-saving properties, and increase tensile elongation at break. In order to enhance economic efficiency, and increase a tensile strength at break, the content is preferably 20% by weight or less, more preferably 2% by weight or less, further preferably 1% by weight or less.

It is preferable that the conjugated diene-based polymer of the present invention has a constituent unit based on vinyl aromatic hydrocarbon (vinyl aromatic hydrocarbon unit) in order to enhance strength. Examples of the vinyl aromatic hydrocarbon include styrene, α-methylstyrene, vinyltoluene, vinylnaphthalene, divinylbenzene, trivinylbenzene, and divinylnaphthalene. Preferable is styrene.

The content of the vinyl aromatic hydrocarbon unit is 0% by weight or more (the content of the conjugated diene unit is 100% by weight or less), preferably 10% by weight or more (the content of the conjugated diene unit is 90% by weight or less), more preferably 15% by weight or more (the content of the conjugated diene unit is 85% by weight or less), relative to the total amount of 100% by weight of the conjugated diene unit and the vinyl aromatic hydrocarbon unit. In order to enhance fuel cost-saving properties, the content of the vinyl aromatic hydrocarbon unit is preferably 50% by weight or less (the content of the conjugated diene unit is 50% by weight or more), more preferably 45% by weight or less (the content of the conjugated diene unit is 55% by weight or more).

The Mooney viscosity ($ML_{1+4}$) of the conjugated diene-based polymer of the present invention is preferably 10 or more, more preferably 20 or more, in order to enhance strength. In order to enhance processability, the Mooney viscosity is preferably 200 or less, more preferably 150 or less. The Mooney viscosity ($ML_{1+4}$) is measured at 100° C. according to JIS K6300 (1994).

The vinyl bonding amount of the conjugated diene-based polymer of the present invention is preferably 80 mol % or less, more preferably 70 mol % or less, relative to the content of 100 mol % of the conjugated diene unit, in order to enhance fuel cost-saving properties. In order to enhance gripping properties, the vinyl bonding amount is preferably 10 mol % or more, more preferably 15 mol % or more, further preferably 20 mol % or more, particularly preferably 40 mol % or more. The vinyl bonding amount is obtained by absorption intensity at around 910 cm$^{-1}$, which is an absorption peak of a vinyl group, using infrared spectrometry.

The molecular weight distribution of the conjugated diene-based polymer of the present invention is preferably 1 to 5, more preferably 1 to 2, in order to enhance fuel cost-saving properties. The molecular weight distribution is obtained by measuring the number average molecular weight (Mn) and the weight average molecular weight (Mw) using a gel permeation chromatography (GPC) method, and dividing Mw by Mn.

Examples of a preferable process for producing the conjugated diene-based polymer of the present invention include a production process comprising the following step A and step B.

(Step A): a step of polymerizing a monomer component comprising a conjugated diene, a compound represented by the above formula (1) and a compound represented by the above formula (2) with an alkali metal catalyst in a hydrocarbon solvent, to obtain a polymer having an alkali metal derived from the alkali metal catalyst, at least on one end of a polymer chain having a monomer unit based on the conjugated diene, a monomer unit based on the compound represented by the above formula (1) and a monomer unit based on the compound represented by the above formula (2).

(Step B): a step of reacting the polymer obtained in the step A with the aforementioned compound (G).

Examples of the alkali metal catalyst used in the step A include an alkali metal, an organic alkali metal compound, a complex of an alkali metal and a polar compound, and an oligomer having an alkali metal. Examples of the alkali metal include lithium, sodium, potassium, rubidium, and cesium. Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenyllide, and potassium naphthalenide. In addition, examples of the complex of an alkali metal and a polar compound include a potassium-tetrahydrofuran complex, and a potassium-diethoxyethane complex, and examples of the oligomer having an alkali metal include a sodium salt of an α-methylstyrene tetramer. Preferable is an organic lithium compound or an organic sodium compound, more preferable is an organic lithium compound having 2 to 20 carbon atoms or an organic sodium compound having 2 to 20 carbon atoms.

The hydrocarbon solvent used in the step A is a solvent which does not inactivate an organic alkali metal compound catalyst, and examples thereof include aliphatic hydrocarbon, aromatic hydrocarbon and alicyclic hydrocarbon. Examples of the aliphatic hydrocarbon include propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. In addition, examples of the aromatic hydrocarbon include benzene, toluene, xylene, and ethylbenzene, and examples of the alicyclic hydrocarbon include cyclopentane, and cyclohexane. One or more kinds thereof are used, and the hydrocarbon solvent may be a mixture of various components, such as industrial hexane. Preferable is hydrocarbon having 2 to 12 carbon atoms.

A monomer component containing a conjugated diene, a compound represented by the above formula (1) and a compound represented by the above formula (2) is polymerized with an alkali metal catalyst in a hydrocarbon solvent to produce a polymer having a monomer unit based on the conjugated diene, a monomer unit based on the compound represented by the above formula (1) and a monomer unit based on the compound represented by the above formula (2). Examples of the conjugated diene include 1,3-butadiene, isoprene, 1,3-pentadiene, 2,3-dimethyl-1,3-butadiene, and 1,3-hexadiene. One or more kinds thereof are used. Preferable is 1,3-butadiene or isoprene.

The amount of the compound represented by the formula (1) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties. In order to enhance economic efficiency, and to increase tensile elongation at break, the amount used is preferably 20% by weight or less, more preferably 2% by weight or less, further preferably 1% by weight or less, particularly preferably 0.5% by weight or less.

The amount of the compound represented by the formula (2) used is preferably 0.01% by weight or more, more preferably 0.02% by weight or more, further preferably 0.05% by weight or more, relative to the total amount of 100% by weight of the monomer components used in the polymerization, in order to enhance fuel cost-saving properties, and to increase tensile elongation at break. In order to enhance economic efficiency, and to increase tensile elongation at break, the amount used is preferably 20% by weight or less, more preferably 2% by weight or less, further preferably 1% by weight or less, particularly preferably 0.5% by weight or less.

The polymerization may be performed by combining vinyl aromatic hydrocarbon with the conjugated diene, the compound represented by the formula (1) and the compound represented by the formula (2), and examples of the vinyl aromatic hydrocarbon include styrene, α-methylstyrene, vinyltoluene, vinylnaphthalene, divinylbenzene, trivinylbenzene, and divinylnaphthalene. Preferable is styrene.

The amount of the vinyl aromatic hydrocarbon used is 0% by weight or more (the amount of the conjugated diene used is 100% by weight or less), and in order to enhance strength, the amount is preferably 10% by weight or more (the amount of the conjugated diene used is 90% by weight or less), more preferably 15% by weight or more (the amount of the conjugated diene used is 85% by weight or less), relative to the total amount of 100% by weight of the conjugated diene and the vinyl aromatic hydrocarbon used. In order to enhance fuel cost-saving properties, the amount of the vinyl aromatic hydrocarbon used is preferably 50% by weight or less (the amount of the conjugated diene used is 50% by weight or more), more preferably 45% by weight or less (the amount of the conjugated diene used is 55% by weight or more).

In addition, the total amount of the conjugated diene, the compound represented by the formula (1), the compound represented by the formula (2) and the vinyl aromatic hydrocarbon used in the polymerization reaction is preferably 99.9% by weight or more, more preferably 99.95% by weight or more, further preferably 100% by weight, relative to the total amount of 100% by weight of the monomers used, in order to enhance strength.

The polymerization reaction may be performed in the presence of an agent which adjusts the vinyl bonding amount of the conjugated diene unit, or an agent which adjusts the distribution of the conjugated diene unit and a monomer unit based on monomers other than the conjugated diene in the conjugated diene-based polymer chain (hereinafter, collectively referred to as "adjusting agent"). Examples of such agents include an ether compound, a tertiary amine, and a phosphine compound. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; aromatic ethers such as diphenyl ether and anisole. Examples of the tertiary amine include triethylamine, tripropylamine, tributylamine, N,N,N'-N'-tetramethylethylenediamine, N,N-diethylaniline, pyridine, and quinoline. In addition, examples of the phosphine compound include trimethylphosphine, triethylphosphine, and triphenylphosphine. One or more kinds thereof are used.

The polymerization temperature in the step A is usually 25 to 100° C., preferably 35 to 90° C. Further preferably 50 to 80° C. The polymerization time is usually 10 minutes to 5 hours.

The step A may be a multistage step. For example, the step A may be a step comprising the following steps a1, a2 and a3.
(Step a1): a step of polymerizing a conjugated diene, a compound represented by the formula (1) and vinyl aromatic hydrocarbon with an alkali metal catalyst in a hydrocarbon solvent, to obtain a conjugated diene-based polymer having an alkali metal derived from the catalyst on a polymer chain end
(Step a2): a step of adding a compound represented by the formula (2) to the hydrocarbon solution obtained in the step a1, and reacting the polymer chain end of the conjugated diene-based polymer obtained in the step a1 with the compound represented by the formula (2), to obtain a conjugated diene-based polymer having a structure in which an alkali metal derived from the alkali metal catalyst is bonded to a monomer unit based on the compound represented by the formula (2), on the polymer chain end
(Step a3): a step of adding a conjugated diene and vinyl aromatic hydrocarbon to the hydrocarbon solution obtained in the step a2, to polymerize the conjugated diene and the vinyl aromatic hydrocarbon with the polymer chain end of the conjugated diene-based polymer obtained in the step a2

In the step B, an amount of the compound (G) to be reacted with the polymer prepared in the step A is usually 0.1 to 3 mol, preferably 0.5 to 2 mol, more preferably 0.7 to 1.5 mol per 1 mol of an alkali metal derived from the organic alkali metal catalyst.

In the production process of the present invention, if necessary, from the polymerization initiation to polymerization termination of the monomer with an alkali metal catalyst, a coupling agent may be added to a hydrocarbon solution of the conjugated diene-based polymer. Examples of the coupling agent include a compound represented by the following formula (4).

$$R^{41a}ML_{4-a} \qquad (4)$$

wherein $R^{41}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agent represented by the formula (4) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent added is preferably 0.03 mol or more, more preferably 0.05 mol or more per 1 mol of an alkali metal derived from an alkali metal catalyst, in order to enhance the processability of the conjugated diene-based polymer. In order to enhance fuel cost-saving properties, the amount is preferably 0.4 mol or less, more preferably 0.3 mol or less.

The conjugated diene-based polymer can be recovered from a hydrocarbon solution of the conjugated diene-based polymer by a publicly-known recovery method, for example, (1) a method of adding a coagulating agent to the hydrocarbon solution of the conjugated diene-based polymer, or (2) a method of adding steam to the hydrocarbon solution of the conjugated diene-based polymer. The recovered conjugated diene-based polymer may be dried with a publicly-known dryer such as a band dryer or an extrusion-type dryer.

The conjugated diene-based polymer of the present invention can be incorporated into other polymer components, additives, etc., and used as a conjugated diene-polymer composition.

Examples of the other polymer components include conventional styrene-butadiene copolymer rubber, polybutadiene rubber, butadiene-isoprene copolymer rubber, and butyl rubber. In addition, examples thereof include natural rubber, an ethylene-propylene copolymer and an ethylene-octene copolymer. One or more kinds of these polymer components are used.

When the other polymer components are incorporated into the conjugated diene-based polymer of the present invention, the amount of the conjugated diene-based polymer of the present invention incorporated is preferably 10% by weight or more, more preferably 20% by weight or more, relative to the total amount of 100% by weight of the polymer components (including the amount of the conjugated diene-based polymer incorporated) incorporated, in order to enhance fuel cost-saving properties.

As the additives, publicly-known additives can be used, and examples thereof include vulcanizing agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid, and zinc oxide; organic peroxides such as dicumyl peroxide, and ditertiary butyl peroxide; reinforcing agents such as silica, and carbon black; fillers such as calcium carbonate, talc, alumina, clay, aluminum hydroxide, and mica; silane coupling agents; extender oils; processing aids; anti-aging agents; lubricants.

Examples of the sulfur include powdery sulfur, precipitated sulfur, colloidal sulfur, insoluble sulfur and high dispersing sulfur. The amount of the sulfur incorporated is preferably 0.1 to 15 parts by weight, more preferably 0.3 to 10 parts by weight, further preferably 0.5 to 5 parts by weight per 100 parts by weight of the polymer component.

Examples of the vulcanization accelerator include thiazole-based vulcanization accelerators such as 2-mercaptobenzothiazole, dibenzothiazyl disulfide, and N-cyclohexyl-2-benzothiazyl sulfenamide; thiuram-based vulcanization accelerators such as tetramethylthiuram monosulfide, and tetramethylthiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, and N,N'-diisopropyl-2-benzothiazole sulfenamide; guanidine-based vulcanization accelerators such as diphenylguanidine, diorthotolylguanidine, and orthotolylbiguanidine. The amount of the vulcanization accelerator incorporated is preferably 0.1 to 5 parts by weight, more preferably 0.2 to 3 parts by weight per 100 parts by weight of the polymer component.

Examples of the silica include dry silica (anhydrous silicic acid), wet silica (hydrous silicic acid), colloidal silica, precipitated silica, calcium silicate, and aluminum silicate. One or more kinds thereof can be used. The BET specific surface area of the silica is preferably 50 to 250 m$^2$/g. The BET specific surface area is measured according to ASTM D1993-03. As commercially available products, trade name Ultrasil® VN3-G manufactured by Degussa, trade name VN3, AQ, ER, RS-150 manufactured by Tosoh Silica Corporation, trade name Zeosil® 1115MP, 1165MP manufactured by Rhodia, etc., can be used.

Examples of the carbon black include furnace black, acetylene black, thermal black, channel black, and graphite. Examples of the carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; acetylene carbon black. One or more kinds thereof can be used.

The nitrogen adsorption specific surface area ($N_2SA$) of carbon black is preferably 5 to 200 m$^2$/g, and the dibutyl phthalate (DBP) absorption amount of carbon black is preferably 5 to 300 ml/100 g. The nitrogen adsorption specific surface area is measured according to ASTM D4820-93, and the DBP absorption amount is measured according to ASTM D2414-93. As commercially available products, trade name Dia Black® N339 manufactured by Mitsubishi Chemical Corporation, trade name Seast® 6, Seast® 7HM, Seast KH manufactured by Tokai Carbon Co., Ltd., trade name CK® 3, Special Black® 4A manufactured by Degussa, etc., can be used.

When a conjugated diene-based polymer composition in which a reinforcing agent is incorporated into the conjugated diene-based polymer of the present invention is used, the amount of the reinforcing agent incorporated is preferably 10 to 150 parts by weight per 100 parts by weight of the amount of the conjugated diene-based polymer of the present invention incorporated. In order to enhance abrasion resistance and strength, the amount incorporated is more preferably 20 parts by weight or more, further preferably 30 parts by weight or more. In order to enhance reinforcing properties, the amount is more preferably 120 parts by weight or less, further preferably 100 parts by weight or less.

When the conjugated diene-based polymer composition in which a reinforcing agent is incorporated into the conjugated diene-based polymer of the present invention is used, in order to enhance fuel cost-saving properties, it is preferable that silica is used as the reinforcing agent. The amount of the silica incorporated is preferably 50 parts by weight or more, more preferably 70 parts by weight or more, relative to the total amount of 100 parts by weight of the reinforcing agent incorporated.

In addition, it is preferable that the weight ratio of the silica to the content of carbon black (content of silica:content of carbon black) used as the reinforcing agent is 2:1 to 50:1. It is more preferable that the weight ratio is 5:1 to 20:1 in order to enhance fuel cost-saving properties and to enhance reinforcing properties.

Examples of the silane coupling agent include vinyltrichlorosilane, vinyltriethoxysilane, vinyltris(β-methoxyethoxy)silane, β-3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One or more kinds thereof are used. As commercially available products, trade name Si69®, Si75® manufactured by Degussa, etc., can be used.

When a conjugated diene-based polymer composition in which a silane coupling agent is incorporated into the conjugated diene-based polymer of the present invention is used, the amount of the silane coupling agent incorporated is preferably 1 to 20 parts by weight, more preferably 2 to 15 parts by weight, further preferably 5 to 10 parts by weight per 100 parts by weight of the silica.

Examples of the extender oils include an aromatic mineral oil (viscosity specific gravity constant (V.G.C. value) 0.900 to 1.049), a naphthene mineral oil (V.G.C. value 0.850 to 0.899), and a paraffin mineral oil (V.G.C. value 0.790 to 0.849). The polycyclic aromatic content of the extender oils is preferably less than 3% by weight, more preferably less than 1% by weight. The polycyclic aromatic content is measured according to the United Kingdom Petroleum Industry Association 346/92 method. In addition, the content of aromatic compound (CA) of the extender oils is preferably 20% by weight or more. One or more kinds of these extender oils are used.

As a method of incorporating the other polymer components or additives into the conjugated diene-based polymer of the present invention to produce a conjugated diene-based polymer composition, a publicly-known method, for example, a method of kneading each component with a publicly-known mixer such as a roll mixer or Bambury mixer can be used.

As kneading conditions, when additives other than the vulcanizing agent and the vulcanization accelerator are incorporated, the kneading temperature is usually 50 to 200° C., preferably 80 to 190° C., and the kneading time is usually 30 seconds to 30 minutes, preferably 1 minute to 30 minutes. When the vulcanizing agent and the vulcanization accelerator are incorporated, the kneading temperature is usually 100° C. or lower, preferably room temperature to 80° C. In addition, a composition in which the vulcanizing agent and the vulcanization accelerator are incorporated is usually subjected to vulcanization treatment such as press vulcanization for use. The vulcanization temperature is usually 120 to 200° C., preferably 140 to 180° C.

The conjugated diene-based polymer composition of the present invention is excellent in fuel cost-saving properties. In addition, the conjugated diene-based polymer composition of the present invention has a high tensile strength at break, and is also excellent in tensile properties.

The conjugated diene-based polymer and conjugated diene-based polymer composition of the present invention are used in tires, soles, floor materials, and vibration prevention materials and, particularly, are suitably used in tires.

EXAMPLES

The present invention will be described below by way of Examples.

The evaluation of physical properties was performed by the following methods.

1. Mooney Viscosity ($ML_{1+4}$)

The Mooney viscosity of a polymer was measured at 100° C. according to JIS K6300 (1994).

2. Vinyl Bonding Amount (Unit: Mol %)

The vinyl bonding amount of a polymer was obtained by absorption intensity at around 910 $cm^{-1}$, which is an absorption peak of a vinyl group, using infrared spectrometry.

3. Content of Styrene Unit (Unit: Wt %)

The content of a styrene unit of a polymer was obtained from a refractive index according to JIS K6383 (1995).

4. Molecular Weight Distribution (Mw/Mn)

The weight average molecular weight (Mw) and the number average molecular weight (Mn) were measured by a gel permeation chromatography (GPC) method under the following conditions (1) to (8), and the molecular weight distribution (Mw/Mn) of a polymer was obtained.

(1) Apparatus: HLC-8220 manufactured by Tosoh Corporation
(2) Separation column: HM-H manufactured by Tosoh Corporation (two in series)
(3) Measurement temperature: 40° C.
(4) Carrier: tetrahydrofuran
(5) Flow rate: 0.6 mL/minute
(6) Injection amount: 5 µL
(7) Detector: differential refractive index
(8) Molecular weight standard: standard polystyrene 5. Fuel Cost-Saving Properties From a sheet-like vulcanization molded body, a strip-like test piece having a width of 1 mm or 2 mm and a length of 40 mm was punched out, and was subjected to a test. For measurements, loss tangent (tan δ (70° C.)) of a test piece at a temperature of 70° C. was measured with a viscoelasticity measuring apparatus (manufactured by Ueshima Seisakusho Co., Ltd.) under the conditions of a strain of 1% and a frequency of 10 Hz. As this value is smaller, fuel cost-saving properties are more excellent.

6. Tensile Strength at Break (TB, Unit: MPa)

Using a No. 3-shaped dumbbell test piece, elongation at which the test piece is broken was measured at a tensile rate of 500 mm/minute according to JIS K6251.

Example 1

A polymerization reactor made of stainless steel equipped with a stirring device having an internal volume of 20 L was washed, dried and replaced with dry nitrogen. Then, 10.2 kg of industrial hexane (density 680 $kg/m^3$), 608 g of 1,3-butadiene, 192 g of styrene, 2.04 g of 4-dimethylaminomethylstyrene, 6.1 ml of tetrahydrofuran, and 4.0 ml of ethylene glycol diethyl ether were placed into the polymerization reactor. Then, 2.74 g of bis(diethylamino)methylvinylsilane, and a solution of n-butyllithium in n-hexane (content of n-butyllithium 15.90 mmol) were placed into the polymerization reactor, and a polymerization reaction was initiated.

A copolymerization reaction of 1,3-butadiene, styrene and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of 4-dimethylaminomethylstyrene placed was 0.10% by weight, and the amount of bis(diethylamino)methylvinylsilane placed was 0.14% by weight.

Then, the resulting polymerization reaction solution was stirred at a stirring rate of 130 rpm, 12.80 mmol of N-(3-dimethylaminopropyl)acrylamide was added, and the mixture was stirred for 15 minutes.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 1

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 2.04 g of 4-dimethylaminomethylstyrene, 6.1 ml of tetrahydrofuran, and 4.1 ml of ethylene glycol diethyl ether were placed into the polymerization reactor. Then, 15.89 mmol of n-butyllithium was placed as a n-hexane solution into the polymerization reactor, and a polymerization reaction was initiated.

The copolymerization reaction of 1,3-butadiene, styrene and 4-dimethylaminomethylstyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of 4-dimethylaminomethylstyrene placed was 0.10% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate)(trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shiko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 2

A polymerization reactor made of stainless steel equipped with a stirring device having an internal volume of 20 L was washed, dried and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.4 ml of ethylene glycol diethyl ether were placed into the polymerization reactor. Then, 2.63 g of bis(diethylamino)methylvinylsilane, and a solution of n-butyllithium in n-hexane (content of n-butyllithium 14.68 mmol) were placed into the polymerization reactor, and a polymerization reaction was initiated.

The copolymerization reaction of 1,3-butadiene, styrene, and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of bis(diethylamino)methylvinylsilane placed was 0.13% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate)(trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 3

A polymerization reactor made of stainless steel equipped with a stirring device having an internal volume of 20 L was washed, dried and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.0 ml of ethylene glycol diethyl ether were placed into the polymerization reactor. Then, 5.43 g of bis(diethylamino)methylvinylsilane, and a solution of n-butyllithium in n-hexane (content of n-butyllithium 14.72 mmol) were placed into the polymerization reactor, and a polymerization reaction was initiated.

The copolymerization reaction of 1,3-butadiene, styrene, and bis(diethylamino)methylvinylsilane was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of bis(diethylamino)methylvinylsilane placed was 0.27% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate)(trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 1.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 4

The interior of a polymerization reactor made of stainless steel having an internal volume of 20 L was washed, dried and replaced with dry nitrogen, and 10.2 kg of industrial hexane (density 680 kg/m$^3$), 547 g of 1,3-butadiene, 173 g of styrene, 6.07 ml of tetrahydrofuran, and 4.12 ml of ethylene glycol diethyl ether were placed into the polymerization reactor. Then, 13.31 mmol of n-butyllithium as a n-hexane solution was placed into the polymerization reactor, and a polymerization reaction was initiated.

A copolymerization reaction of 1,3-butadiene and styrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 821 g, and the amount of styrene supplied was 259 g.

Then, the resulting polymerization reaction solution was stirred at a stirring rate of 130 rpm, 11.25 mmol of N-(3-dimethylaminopropyl)acrylamide was added, and the mixture was stirred for 15 minutes.

To the polymerization reaction solution was added 20 ml of a hexane solution containing 1.12 ml of methanol, and the polymerization reaction solution was further stirred for 5 minutes.

Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Example 2

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 3.37 g of 4-bis(trimethylsilyl)aminostyrene, 6.1 ml of tetrahydrofuran, and 4.0 ml of ethylene glycol diethyl ether were placed into the polymerization reactor. Then, 2.74 g of bis(diethylamino)methylvinylsilane, and a solution of n-butyllithium in n-hexane (content of n-butyllithium 15.55 mmol) were placed into the polymerization reactor, and a polymerization reaction was initiated.

The copolymerization reaction of 1,3-butadiene, styrene, bis(diethylamino)methylvinylsilane, and 4-bis(trimethylsilyl)aminostyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of 4-bis(trimethylsilyl)aminostyrene placed was 0.17% by weight, and the amount of bis(diethylamino)methylvinylsilane placed was 0.14% by weight.

Then, the resulting polymerization reaction solution was stirred at a stirring rate of 130 rpm, 12.80 mmol of N-(3-dimethylaminopropyl)acrylamide was added, and the mixture was stirred for 15 minutes.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Example 3

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 1.41 g of 4-pyridine, 6.1 ml of tetrahydrofuran, and 4.0 ml of ethylene glycol diethyl ether were placed into the polymerization reactor. Then, 2.88 g of bis(diethylamino)methylvinylsilane, and a solution of n-butyllithium in n-hexane (content of n-butyllithium 18.92 mmol) was placed into the polymerization reactor, and a polymerization reaction was initiated.

A copolymerization reaction of 1,3-butadiene, styrene and bis(diethylamino)methylvinylsilane was performed for 3 hours at a stirring rate of 130 rpm, and a temperature in the polymerization reactor of 65° C. while 1,3-butadiene and styrene were continuously supplied into the polymerization reactor. The amount of 1,3-butadiene supplied was 912 g, and the amount of styrene supplied was 288 g.

In the total amount of monomers which were placed and supplied into the polymerization reactor, the amount of 4-vinylpyridine placed was 0.17% by weight, and the amount of bis(diethylamino)methylvinylsilane placed was 0.14% by weight.

Then, the resulting polymerization reaction solution was stirred at a stirring rate of 130 rpm, 13.42 mmol of N-(3-dimethylaminopropyl)acrylamide was added, and the mixture was stirred for 15 minutes.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Example 4

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.0 ml of ethylene glycol diethyl ether were placed into the polymerization reactor. Then, 2.88 g of bis(diethylamino)methylvinylsilane, and a solution of n-butyllithium in n-hexane (content of n-butyllithium 15.48 mmol) were placed into the polymerization reactor, and a polymerization reaction was initiated.

A copolymerization reaction of 1,3-butadiene and styrene was performed for 45 minutes at a stirring rate of 130 rpm and a temperature in the polymerization reactor of 65° C. while 1,3-butadiene and styrene were continuously supplied into the polymerization reactor. The amount of 1,3-butadiene supplied was 304 g, and the amount of styrene supplied was 96 g.

After 45 minutes passed from addition of n-butyllithium, a cyclohexane solution of 13.42 mmol (3.00 g) of 1-(4-N,N-dimethylaminophenyl)-1-phenylethylene was placed into the polymerization reactor, and the polymer solution was stirred at a stirring rate of 130 rpm.

After 65 minutes passed from addition of 1-(4-N,N-dimethylaminophenyl)-1-phenylethylene, a copolymerization reaction was further performed for 130 minutes at a stirring rate of 130 rpm and a temperature in the polymerization reactor of 65° C. while 1,3-butadiene and styrene were continuously supplied into the polymerization reactor. The amount of 1,3-butadiene supplied was 608 g, and the amount of styrene supplied was 192 g.

In the total amount of monomers which were placed and supplied into the polymerization reactor, the amount of 1-(4-N,N-dimethylaminophenyl)-1-phenylethylene placed was 0.15% by weight, and the amount of bis(diethylamino)methylvinylsilane placed was 0.14% by weight.

Then, the resulting polymerization reaction solution was stirred at a stirring rate of 130 rpm, 13.42 mmol of N-(3-dimethylaminopropyl)acrylamide was added, and the mixture was stirred for 15 minutes.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate)(trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 2.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Comparative Example 5

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 0.70 g of 4-bis(trimethylsilyl)aminostyrene, 1.52 ml of tetrahydrofuran, and 1.18 ml of ethylene glycol diethyl ether were placed into the polymerization reactor. Then, 3.81 mmol of n-butyllithium as a n-hexane solution was placed into the polymerization reactor, and a polymerization reaction was initiated.

The copolymerization reaction of 1,3-butadiene, styrene, and 4-bis(trimethylsilyl)aminostyrene was performed for 2 hours at a stirring rate of 130 rpm, and a temperature in the polymerization reactor of 65° C. while 1,3-butadiene and styrene were continuously supplied into the polymerization reactor. The amount of 1,3-butadiene supplied was 205 g, and the amount of styrene supplied was 65 g. In the total amount of monomers which were placed and supplied into the polymerization reactor, the amount of 4-bis(trimethylsilyl)aminostyrene placed was 0.16% by weight.

To the polymer solution was added 10 ml of a hexane solution containing 0.5 ml of methanol, and the polymer solution was stirred for 5 minutes. Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 3.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Comparative Example 6

A polymerization reactor made of stainless steel equipped with a stirring device having an internal volume of 20 L was washed, dried, and replaced with dry nitrogen. Then, 10.2 kg of industrial hexane (density 680 kg/m$^3$), 608 g of 1,3-butadiene, 192 g of styrene, 1.41 g of 4-pyridine, 6.1 ml of tetrahydrofuran, and 4.0 ml of ethylene glycol diethyl ether were placed into the polymerization reactor. Then, 18.52 mmol of n-butyllithium was placed as a n-hexane solution into the polymerization reactor, and a polymerization reaction was initiated.

The copolymerization reaction of 1,3-butadiene, styrene and 4-dimethylaminomethylstyrene was performed for 3 hours at a stirring rate of 130 rpm and a temperature in the polymerization reactor of 65° C. while 1,3-butadiene and styrene were continuously supplied into the polymerization reactor. The amount of 1,3-butadiene supplied was 912 g, and the amount of styrene supplied was 288 g. In the total amount of monomers which were placed and supplied into the polymerization reactor, the amount of 4-vinylpyridine placed was 0.17% by weight.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 4.0 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 3.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Comparative Example 7

The interior of a polymerization reactor made of stainless steel equipped with a stirring device having an internal volume of 5 L was washed, dried, and replaced with dry nitrogen. Then, 2.55 kg of industrial hexane (density 680 kg/m$^3$), 137 g of 1,3-butadiene, 43 g of styrene, 1.51 ml of tetrahydrofuran, and 1.09 ml of ethylene glycol diethyl ether were placed into the polymerization reactor. Then, 3.54 mmol of n-butyllithium as a n-hexane solution was placed into the polymerization reactor, and a polymerization reaction was initiated.

A copolymerization reaction of 1,3-butadiene and styrene was performed for 2 hours at a stirring rate of 130 rpm and a temperature in the polymerization reactor of 65° C. while 1,3-butadiene and styrene were continuously supplied into the polymerization reactor. The amount of 1,3-butadiene supplied was 205 g, and the amount of styrene supplied was 65 g.

Then, the resulting polymer solution was stirred at a stirring rate of 130 rpm, a cyclohexane solution of 0.64 g of 1-(4-N,N-dimethylaminophenyl)-1-phenylethylene was placed into the polymer solution, and the mixture was further stirred for 90 minutes. To the polymer solution was added 10 ml of a hexane solution containing 0.2 ml of methanol, and the polymer solution was further stirred for 5 minutes.

In the total amount of monomers which were placed and supplied into the polymerization reactor, the amount of 1-(4-N,N-dimethylaminophenyl)-1-phenylethylene placed was 0.14% by weight.

Then, to the polymer solution were added 1.8 g of 2-tert-butyl-6-(3-tert-butyl-2-hydroxy-5-methylbenzyl)-4-methylphenyl acrylate (trade name: Sumilizer® GM, manufactured by Sumitomo Chemical Co., Ltd.), and 0.9 g of pentaerythrityltetrakis(3-laurylthiopropionate) (trade name: Sumilizer® TP-D, manufactured by Sumitomo Chemical Co., Ltd.) and, then, the polymer solution was evaporated at room temperature over 24 hours, and further dried at 55° C. for 12 hours under reduced pressure to obtain a polymer. The evaluation results of the polymer are shown in Table 3.

Then, 100 parts by weight of the resulting polymer, 78.4 parts by weight of silica (trade name: Ultrasil® VN3-G, manufactured by Degussa), 6.4 parts by weight of a silane coupling agent (trade name: Si69®, manufactured by Degussa), 6.4 parts by weight of carbon black (trade name: Dia Black® N339, manufactured by Mitsubishi Chemical Corporation), 47.6 parts by weight of an extender oil (trade name: JOMO process NC-140, manufactured by Japan Energy Corporation), 1.5 parts by weight of an anti-aging agent (trade name: Antigen® 3C, manufactured by Sumitomo Chemical Co., Ltd.), 2 parts by weight of stearic acid, 2 parts by weight of zinc flower, 1 part by weight of a vulcanization accelerator (trade name: Soxinol® CZ, manufactured by Sumitomo Chemical Co., Ltd.), 1 part by weight of a vulcanization accelerator (trade name: Soxinol® D, manufactured by Sumitomo Chemical Co., Ltd.), 1.5 parts by weight of a wax (trade name: Sunnoc® N, manufactured by Ouchi Shinko Chemical Industrial Co., Ltd.), and 1.4 parts by weight of sulfur were kneaded with a laboplast mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

TABLE 1

|  |  | Example 1 | Comparative Example 1 | Comparative Example 2 | Comparative Example 3 | Comparative Example 4 |
|---|---|---|---|---|---|---|
| Mooney viscosity | — | 42.2 | 39.0 | 40.9 | 45.3 | 40.6 |
| Vinyl bonding amount | mol % | 55.6 | 58.1 | 57.6 | 57.4 | 56.5 |
| Content of styrene unit | wt % | 24.5 | 24.5 | 24.4 | 24.1 | 24.4 |
| Molecular weight distribution | — | 1.18 | 1.06 | 1.09 | 1.06 | 1.09 |
| Fuel cost-saving properties tanδ (70° C.) | — | 0.123 | 0.216 | 0.141 | 0.124 | 0.210 |
| Tensile strength at break TB | MPa | 16.2 | 11.5 | 14.3 | 14.4 | 13.2 |

TABLE 2

|  |  | Example 2 | Example 3 | Example 4 |
|---|---|---|---|---|
| Mooney viscosity | — | 39.2 | 39.5 | 39.8 |
| Vinyl bonding amount | mol % | 57.4 | 55.3 | 55.8 |
| Content of styrene unit | wt % | 24.6 | 24.4 | 24.3 |
| Molecular weight distribution | — | 1.11 | 1.16 | 1.12 |
| Fuel cost-saving properties tanδ (70° C.) | — | 0.123 | 0.123 | 0.122 |
| Tensile strength at break TB | MPa | 16.0 | 15.6 | 15.8 |

TABLE 3

|  |  | Comparative Example 5 | Comparative Example 6 | Comparative Example 7 |
|---|---|---|---|---|
| Mooney viscosity | — | 50.0 | 35.9 | 33.4 |
| Vinyl bonding amount | mol % | 58.6 | 57.1 | 58.0 |
| Content of styrene unit | wt % | 23.5 | 24.7 | 23.7 |
| Molecular weight distribution | — | 1.09 | 1.13 | 1.06 |
| Fuel cost-saving properties tanδ (70° C.) | — | 0.188 | 0.212 | 0.214 |
| Tensile strength at break TB | MPa | 13.7 | 11.5 | 11.8 |

What is claimed is:

1. A conjugated diene-based polymer having a monomer unit based on a conjugated diene, a monomer unit based on a compound represented by the following formula (1), and a monomer unit based on a compound represented by the following formula (2), in which at least one end of the polymer is modified with the following compound (G):

$$V^1\text{-}S^1 \tag{1}$$

wherein $V^1$ represents a hydrocarbyl group having a polymerizable carbon-carbon double bond, and $S^1$ represents a substituted silyl group;

$$V^2\text{-}A^2 \tag{2}$$

wherein $V^2$ represents a hydrocarbyl group having a polymerizable carbon-carbon double bond, and $A^2$ represents a substituted amino group, or a nitrogen-containing heterocyclic group;

Compound (G): at least one kind of compound selected from the compound group consisting of a compound having an amino group optionally having a substituent and a carbonyl group, and a compound having an amino group optionally having a substituent and a thiocarbonyl group.

2. The conjugated diene-based polymer according to claim 1, $V^2$ in the formula (2) is a group represented by the following formula (2-V1):

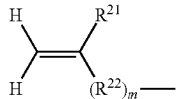
(2-VI)

wherein $R^{21}$ represents a hydrogen atom or a hydrocarbyl group, m is an integer of 0 or 1, and $R^{22}$ represents a hydrocarbylene group.

3. The conjugated diene-based polymer according to claim 1, wherein the substituted amino group of $A^2$ is a group represented by the following formula (2-A):

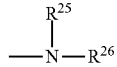
(2-A)

wherein $R^{25}$ and $R^{26}$ each independently represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero atom, or $R^{25}$ and $R^{26}$ are one group, and represent a group which bonds to a nitrogen atom with a double bond.

4. The conjugated diene-based polymer according to claim 1, wherein the compound (G) is a compound represented by the following formula (3):

(3)

wherein E represents an oxygen atom or a sulfur atom, $Z^1$ and $Z^2$ each independently represent a substituted amino group, a hydrogen atom, a hydrocarbyl group optionally having a substituent, or a hydrocarbyloxy group optionally having a substituent, wherein at least one of $Z^1$ and $Z^2$ is a group having a substituted amino group, or $Z^1$ and $Z^2$ are bonded to represent a group in which a ring structure having a substituted amino group is formed by $Z^1$, $Z^2$ and carbonyl carbon.

5. The conjugated diene-based polymer according to claim 4, wherein in the formula (3), E is an oxygen atom, $Z^1$ is a group represented by the following formula (3-Z), and $Z^2$ is a hydrocarbyl group or a group represented by the following formula (3-Z):

wherein p is an integer of 0 or 1, T represents a hydrocarbylene group having 1 to 10 carbon atoms, a group represented by the following formula (3-Ta), or a group represented by the following formula (3-Tb), and $A^3$ represents a substituted amino group and, when $Z^2$ of the formula (3) is a hydrocarbyl group, $A^3$ of $Z^1$ and a hydrocarbylene group of $Z^2$ may be bonded and, when $Z^2$ of the formula (3) is a group represented by the formula (3-Z), $A^3$ of $Z^1$ and $A^3$ of $Z^2$ may be bonded;

wherein $R^{31}$ represents a hydrocarbylene group having 1 to 10 carbon atoms, and $R^{31}$ and $A^3$ are bonded;

wherein $R^{32}$ represents a hydrocarbylene group having 1 to 10 carbon atoms, $R^{33}$ represents a hydrogen atom or a hydrocarbyl group having 1 to 10 carbon atoms, and $R^{32}$ and $A^3$ are bonded.

6. The conjugated diene-based polymer according to claim 1, wherein the group represented by $V^1$ in the formula (1) is a group represented by the following formula (1-V1), and the group represented by $S^1$ in the formula (1) is a group represented by the following formula (1-S):

wherein $R^{11}$ represents a hydrogen atom or a hydrocarbyl group, n is an integer of 0 or 1, and $R^{12}$ represents a hydrocarbylene group;

wherein $X^1$, $X^2$ and $X^3$ each represent a substituted amino group, or a hydrocarbylene group optionally having a substituent, wherein at least one of $X^1$, $X^2$ and $X^3$ is a substituted amino group.

7. The conjugated diene-based polymer according to claim 6, wherein $R^{11}$ in the formula (1-V1) is a hydrogen atom, and n in the formula (1-V1) is 0.

8. The conjugated diene-based polymer according to claim 1, wherein the vinyl bonding amount of the conjugated diene-based polymer is 20 mol % or more and 70 mol % or less, relative to the content of 100 mol % of a monomer unit based on a conjugated diene.

9. A conjugated diene-based polymer composition comprising the conjugated diene-based polymer according to claim 1 and a reinforcing agent, wherein the content of the reinforcing agent is 10 to 150 parts by weight per 100 parts by weight of the conjugated diene-based polymer.

10. The conjugated diene-based polymer composition according to claim 9, wherein the composition comprises silica and carbon black as the reinforcing agent, and the weight ratio of the content of silica to the content of carbon black (content of silica:content of carbon black) is 2:1 to 50:1.

11. A process for producing a conjugated diene-based polymer comprising the following step A and step B:
(Step A): a step of polymerizing a monomer component comprising a conjugated diene, a compound represented by the following formula (1) and a compound represented by the following formula (2) with an alkali metal catalyst in a hydrocarbon solvent, to obtain a polymer having an alkali metal derived from the alkali metal catalyst, at least on one end of a polymer chain having a monomer unit based on the conjugated diene, a monomer unit based on the compound represented by the following formula (1) and a monomer unit based on the compound represented by the following formula (2):

wherein $V^1$ represents a hydrocarbyl group having a polymerizable carbon-carbon double bond, and $S^1$ represents a substituted silyl group;

wherein $V^2$ represents a hydrocarbyl group having a polymerizable carbon-carbon double bond, and $A^2$ represents a substituted amino group, or a nitrogen-containing heterocyclic group;
(Step B): a step of reacting the polymer obtained in the step A with the following compound (G):
Compound (G): at least one kind of compound selected from the compound group consisting of a compound having an amino group optionally having a substituent and a carbonyl group, and a compound having an amino group optionally having a substituent and a thiocarbonyl group.

12. The process for producing a conjugated diene-based polymer according to claim 11, wherein the group represented by $V^2$ in the formula (2) is a group represented by the following formula (2-V1):

wherein $R^{21}$ represents a hydrogen atom or a hydrocarbyl group, m is an integer of 0 or 1, and $R^{22}$ represents a hydrocarbylene group.

13. The process for producing a conjugated diene-based polymer according to claim 11, wherein the substituted amino group is a group represented by the following formula (2-A):

wherein $R^{25}$ and $R^{26}$ each represent a hydrocarbyl group, or a trihydrocarbylsilyl group, or $R^{25}$ and $R^{26}$ are bonded to represent a hydrocarbylene group optionally having a nitrogen atom and/or an oxygen atom as a hetero atom, or $R^{25}$ and $R^{26}$ are one group, and represent a group which bonds to a nitrogen atom with a double bond.

14. The process for producing a conjugated diene-based polymer according to claim 11, wherein the compound (G) is a compound represented by the following formula (3):

(3)

wherein E represents an oxygen atom or a sulfur atom, $Z^1$ and $Z^2$ represent a substituted amino group, a hydrogen atom, a hydrocarbyl group optionally having a substituent, or a hydrocarbyloxy group optionally having a substituent, wherein at least one of $Z^1$ and $Z^2$ is a group having a substituted amino group, or $Z^1$ and $Z^2$ are bonded to represent a group in which a ring structure having a substituted amino group is formed by $Z^1$, $Z^2$ and carbonyl carbon.

15. The process for producing a conjugated diene-based polymer according to claim 14, wherein in the formula (3), E is an oxygen atom, $Z^1$ is a group represented by the following formula (3-Z), and $Z^2$ is a hydrocarbyl group or a group represented by the following formula (3-Z):

-(T)$_p$-A$^3$      (3-Z)

wherein p is an integer of 0 or 1, T represents a hydrocarbylene group having 1 to 10 carbon atoms, a group represented by the following formula (3-Ta), or a group represented by the following formula (3-Tb), and $A^3$ represents a substituted amino group and, when $Z^2$ of the formula (3) is a hydrocarbyl group, $A^3$ of $Z^1$ and a hydrocarbylene group of $Z^2$ may be bonded and, when $Z^2$ of the formula (3) is a group represented by the formula (3-Z), $A^3$ of $Z^1$ and $A^3$ of $Z^2$ may be bonded;

—O—R$^{31}$—      (3-Ta)

wherein $R^{31}$ represents a hydrocarbylene group having 1 to 10 carbon atoms, and $R^{31}$ and $A^3$ are bonded;

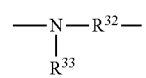
(3-Tb)

wherein $R^{32}$ represents a hydrocarbylene group having 1 to 10 carbon atoms, $R^{33}$ represents a hydrogen atom or a hydrocarbyl group having 1 to 10 carbon atoms, and $R^{32}$ and $A^3$ are bonded.

16. The process for producing a conjugated diene-based polymer according to claim 11, wherein the group represented by $V^1$ in the formula (1) is a group represented by the following formula (1-V1), and the group represented by $S^1$ in the formula (1) is a group represented by the following formula (1-S):

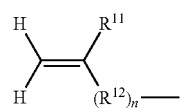
(1-VI)

wherein $R^{11}$ represents a hydrogen atom or a hydrocarbyl group, n is an integer of 0 or 1, and $R^{12}$ represents a hydrocarbylene group;

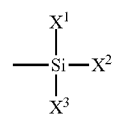
(1-S)

wherein $X^1$, $X^2$ and $X^3$ each represent independently a substituted amino group, or a hydrocarbyl group optionally having a substituent, wherein at least one of $X^1$, $X^2$ and $X^3$ is a substituted amino group.

17. The process for producing a conjugated diene-based polymer according to claim 16, wherein $R^{11}$ in the formula (1-V1) is a hydrogen atom, and n in the formula (1-V1) is 0.

* * * * *

UNITED STATES PATENT AND TRADEMARK OFFICE
CERTIFICATE OF CORRECTION

| | | |
|---|---|---|
| PATENT NO. | : 8,334,339 B2 | Page 1 of 1 |
| APPLICATION NO. | : 13/206166 | |
| DATED | : December 18, 2012 | |
| INVENTOR(S) | : Mana Ito et al. | |

It is certified that error appears in the above-identified patent and that said Letters Patent is hereby corrected as shown below:

Title page

Insert

--(30) Foreign Application Priority Data

Aug. 11, 2010 (JP)    2010-180024

<u>Mar. 7, 2011 (JP)    2011-048589</u>--

Signed and Sealed this
Nineteenth Day of March, 2013

Teresa Stanek Rea
*Acting Director of the United States Patent and Trademark Office*